US011161940B2

(12) United States Patent
Sidorenko et al.

(10) Patent No.: US 11,161,940 B2
(45) Date of Patent: Nov. 2, 2021

(54) BIOCOMPATIBLE HYBRID MOLECULAR BRUSHES AND METHODS OF MAKING SAME

(71) Applicant: UNIVERSITY OF THE SCIENCES, Philadelphia, PA (US)

(72) Inventors: Alexander Sidorenko, Cherry Hill, NJ (US); Sriramakamal Jonnalagadda, Plymouth Meeting, PA (US); Manasi Chawathe, Philadelphia, PA (US)

(73) Assignee: University of the Sciences, Philadelphia, PA (US)

( * ) Notice: Subject to any disclaimer, the term of this patent is extended or adjusted under 35 U.S.C. 154(b) by 154 days.

(21) Appl. No.: 16/596,890

(22) Filed: Oct. 9, 2019

(65) Prior Publication Data

US 2020/0109243 A1 Apr. 9, 2020

Related U.S. Application Data

(60) Provisional application No. 62/743,063, filed on Oct. 9, 2018.

(51) Int. Cl.
*C08G 81/02* (2006.01)
*C08G 83/00* (2006.01)

(52) U.S. Cl.
CPC ......... *C08G 81/027* (2013.01); *C08G 83/001* (2013.01)

(58) Field of Classification Search
CPC ...... C08G 83/001; C08G 81/00; C08G 81/02; C08G 81/021; C08G 81/022; C08G 81/024; C08G 81/025; C08G 81/027; C08G 81/028
See application file for complete search history.

(56) References Cited

U.S. PATENT DOCUMENTS

2007/0281904 A1* 12/2007 Baker .................. C08B 37/003
514/55

OTHER PUBLICATIONS

Sigma Aldrich Miscibility Chart, download May 21, 2021. (Year: 2021).*
Hall-Edgefield, et al. "Hybrid Molecular Brushes with Chitosan Backbone: Facile Synthesis and Surface Grafting", ACS Applied Materials & Interfaces, 6, 22026-22033, Dec. 1, 2014. (Year: 2014).*
Chawathe, et al., "Design of hybrid molecular brushes with reversible surface adaptability on exposure to specific solvents", Biointerphases, vol. 13, No. 4, Jul. 12, 2018, p. 041006-1-041006-12.
Zhang , et al., "Poly(ethylene oxide)-b-poly(propylene oxide)-b-poly(ethylene oxide)-g-poly(vinyl pyrrolidone): Synthesis and characterization", Journal of Colloid and Interface Science, vol. 285, No. 1, 2005, pp. 80-85.

* cited by examiner

*Primary Examiner* — Christopher M Rodd
(74) *Attorney, Agent, or Firm* — Saul Ewing Arnstein & Lehr LLP; Domingos J. Silva; Kevin T. O'Brien

(57) ABSTRACT

The present invention relates to the unexpected discovery of novel hybrid molecular brush (HMB) polymers and materials that are able to alter their characteristics based on the surrounding solvent properties. In certain embodiments, the HMBs are amphiphilic, comprising a backbone, at least one hydrophilic side-chain, and at least one hydrophobic side-chain. In another aspect, the invention relates to methods of making the HMBs of the invention.

20 Claims, 22 Drawing Sheets

BIOCOMPATIBLE HYBRID MOLECULAR BRUSHES AND METHODS OF MAKING SAME

CROSS-REFERENCE TO RELATED APPLICATIONS

This application claims priority under 35 U.S.C. § 119(e) to U.S. Provisional Patent Application No. 62/743,063, filed Oct. 9, 2018, which application is incorporated herein by reference in its entirety.

BACKGROUND OF THE INVENTION

Hybrid molecular brushes (HMBs) are polymeric constructs comprising a backbone and side-chains of two or more polymers with varying properties. The overall molecular structure of HMBs is governed by steric repulsion among the side-chains, and their grafting density on the backbone. HMBs with hydrophilic and hydrophobic fragments are amphiphilic in nature, exhibit surfactant-like properties, and can facilitate the formation of core-shell like micelles. HMBs are currently being investigated for potential applications as micro- and nanocarriers for site-specific drug delivery, stabilizers for emulsions, coatings for nanoparticles to prevent aggregation, and stimuli-responsive materials for protein binding.

Several methods have been employed for the synthesis of HMBs. Synthetic processes may be carried out in a single-step grafting process at elevated temperature, or in multiple steps involving modification of the backbone and/or side-chains, followed by grafting. For the synthesis of HMBs with side-chains of varying chemical structures, immiscibility and thus solvent selection pose a major challenge.

Therefore, there remains a need in the art for novel HMBs comprising varied polymer side-chains, as well as methods of making the same. In certain embodiments, the HMBs comprise a backbone, at least one hydrophobic polymer side-chain, and at least one hydrophilic polymer side-chain. The present invention fulfills these needs.

BRIEF SUMMARY OF THE INVENTION

In certain embodiments, the invention provides a hybrid molecular brush (HMB) comprising a backbone polymer, at least one hydrophilic side-chain polymer, and at least one hydrophobic side-chain polymer. In certain embodiments, the backbone polymer comprises chitosan. In certain embodiments, the at least one hydrophilic side-chain polymer comprises polyvinylpyrrolidone. In certain embodiments, the at least one hydrophilic side-chain polymer comprises polyacrylamide (PAAm). In certain embodiments, the at least one hydrophilic side-chain polymer comprises polyethylene glycol. In certain embodiments, the at least one hydrophobic side-chain polymer comprises at least one polymer selected from the group consisting of polylactide (polylactic acid, PLA), polycaprolactone, polybutyrolactone, polyvalerolactone, polyglycolide (polyglycolic acid), and any random and block copolymers thereof.

In certain embodiments, the invention provides a method of making a hybrid molecular brush. The method comprises grafting a hydrophobic polymer to a backbone polymer in a biphasic non-emulsion system. In certain embodiments, the biphasic non-emulsion system is prepared by mixing a first solution of a backbone polymer in a first solvent with a second solution of a side-chain polymer precursor in a second solvent, wherein the first solution and the second solution are immiscible upon first contact and do not form an emulsion.

BRIEF DESCRIPTION OF THE DRAWINGS

For the purpose of illustrating the invention, depicted in the drawings are certain embodiments of the invention. However, the invention is not limited to the precise arrangements and instrumentalities of the embodiments depicted in the drawings.

FIG. 4A is a photograph of CHI-g-PLA as an odorless yellow solid. FIG. 4B is a photograph of CHI-g-PLA-g-PNVP (HMB1) as a white solid. FIG. 4C is a photograph of CHI-g-PLA-g-PAAm (HMB2) as a pale yellow flaky solid.

FIG. 11A is a CHI-g-PLA-g-PNVP film upon exposure to water. FIG. 11B is a CHI-g-PLA-g-PNVP film on exposure to anisole. FIG. 11C is a CHI-g-PLA-g-PAAm film on exposure to water. FIG. 11D is a CHI-g-PLA-g-PAAm film on exposure to anisole.

DETAILED DESCRIPTION OF THE INVENTION

Figure 1A:
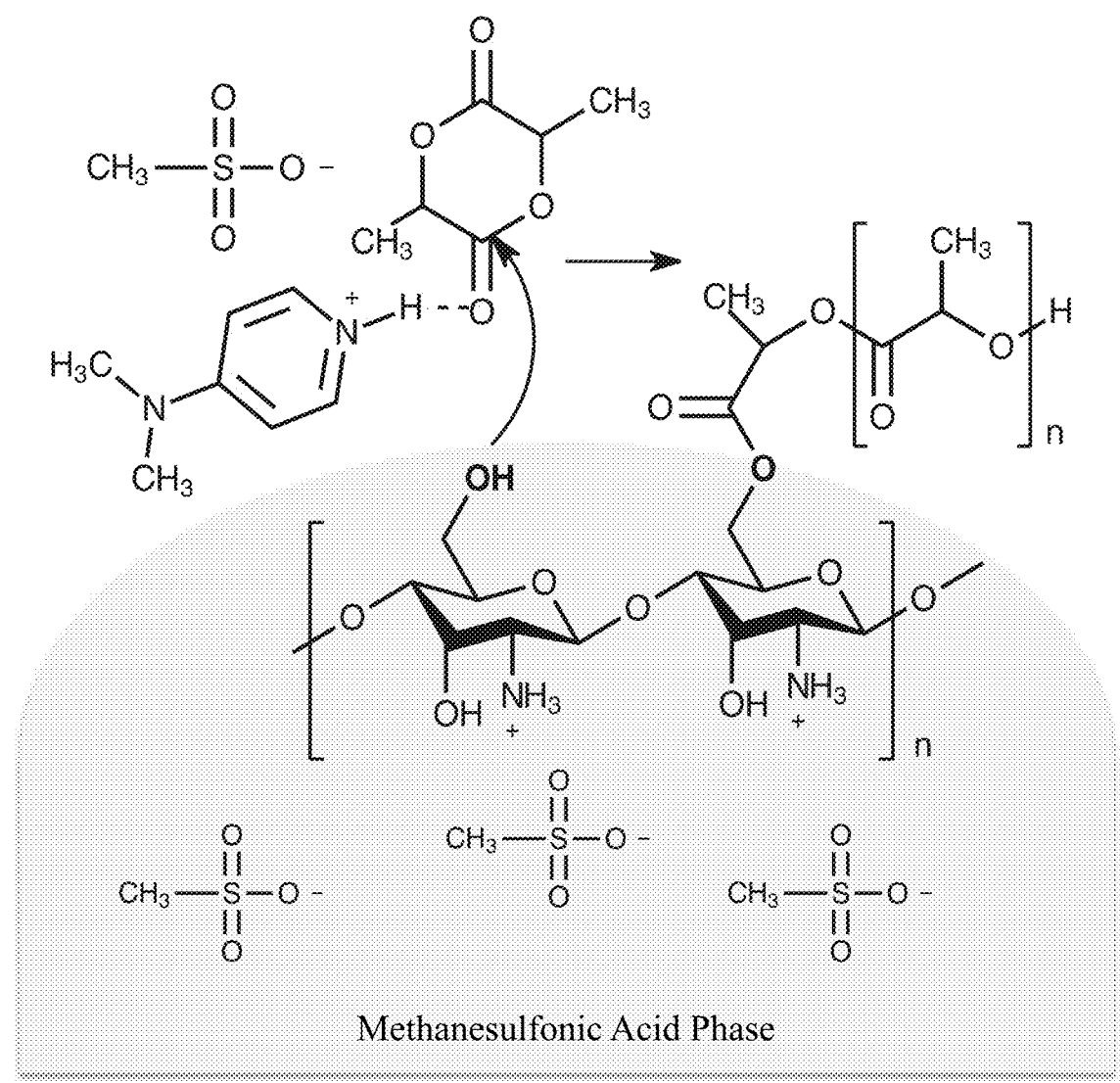
FIG. 1A is a scheme showing synthesis of CHI-g-PLA (CHI=chitin) by ring opening polymerization (ROP) of D,L-lactide in a biphasic system of dichloromethane (DCM) and methanesulfonic acid (MSA) with a dual system of MSA and 4-dimethylaminopyridine (4-DMAP) as co-catalysts.

In one aspect, the present invention relates to the unexpected discovery of novel hybrid molecular brush (HMB) polymers and materials that are able to alter their characteristics based on the surrounding solvent properties. In certain embodiments, the HMBs are amphiphilic, comprising a backbone, at least one hydrophilic side-chain, and at least one hydrophobic side-chain. In another aspect, the invention relates to methods of making the HMBs of the invention.

In certain aspects, the HMBs of the invention can be used in a wide range of practical applications, including, but not limited to, tissue engineering and/or drug delivery.
Compounds In one aspect, the invention provides hybrid molecular brush (HMB) macromolecules. In certain embodiments, the HMBs comprise a backbone polymer, at least one hydrophilic side-chain polymer, and at least one hydrophobic side-chain polymer. In other embodiments, the at least one hydrophilic side-chain polymer and the at least one hydrophobic side-chain polymer are covalently bound to the backbone polymer. In certain embodiments, the HMBs have a "bottle-brush" shape and/or a "comb" shape.

In certain embodiments, the backbone polymer comprises chitosan. In other embodiments, the backbone polymer is chitosan.

In certain embodiments, the at least one hydrophilic side-chain polymer comprises at least one polymer selected from the group consisting of polyvinylpyrrolidone, poly acrylamide (PAAm), and polyethylene glycol. In other embodiments, the at least one hydrophilic side-chain polymer is polyvinylpyrrolidone.

In certain embodiments, the at least one hydrophobic side-chain polymer comprises at least one polymer selected from the group consisting of polylactide (polylactic acid, PLA), polycaprolactone, polybutyrolactone, polyvalerolactone, polyglycolide (polyglycolic acid), and any random and block copolymers thereof. In other embodiments, the at least one hydrophobic side-chain polymer is polylactide.

In certain embodiments, the HMB comprises a chitosan backbone, at least one polylactide side-chain, and at least one polyvinylpyrrolidone side-chain. In other embodiments, the at least one polylactide side-chain is covalently bound to a hydroxyl group on the chitosan, such as for example the 6'-OH group of the chitosan. In yet other embodiments, the at least one polyvinylpyrrolidone side-chain is covalently bound to an amine group on the chitosan.

In certain embodiments, the HMB comprises about 1 to about 10,000 hydrophobic side-chains per backbone chain. In certain embodiments, the HMB comprises about 1, 500, 1000, 1500, 2000, 2500, 3000, 3500, 4000, 4500, 5000, 5500, 6000, 6500, 7000, 7500, 8000, 8500, 9000, 9500 to about 10,000 hydrophobic side-chains per backbone chain.

In other embodiments, the HMB comprises about 1 to about 1,000 hydrophobic side-chains per backbone chain. In certain embodiments, the HMB comprises about 1, 50, 100, 150, 200, 250, 300, 350, 400, 450, 500, 550, 600, 650, 700, 750, 800, 850, 900, 950 to about 1000 hydrophobic side-chains per backbone chain.

In yet other embodiments, the HMB comprises about 1 to about 100 hydrophobic side-chains per backbone chain. In certain embodiments, the HMB comprises about 1, 5, 10, 15, 20, 25, 30, 35, 40, 45, 50, 55, 60, 65, 70, 75, 80, 85, 90, 95 to about 100 hydrophobic side-chains per backbone chain.

In yet other embodiments, the HMB comprises about 9 to about 10 hydrophobic side-chains per backbone chain.

In certain embodiments, the HMB comprises about 1 to about 10,000 hydrophilic side-chains per backbone chain. In certain embodiments, the HMB comprises about 1, 500, 1000, 1500, 2000, 2500, 3000, 3500, 4000, 4500, 5000, 5500, 6000, 6500, 7000, 7500, 8000, 8500, 9000, 9500 to about 10,000 hydrophilic side-chains per backbone chain.

In other embodiments, the HMB comprises about 1 to about 1,000 hydrophilic side-chains per backbone chain. In certain embodiments, the HMB comprises about 1, 50, 100, 150, 200, 250, 300, 350, 400, 450, 500, 550, 600, 650, 700, 750, 800, 850, 900, 950 to about 1000 hydrophilic side-chains per backbone chain.

In yet other embodiments, the HMB comprises about 1 to about 100 hydrophilic side-chains per backbone chain. In certain embodiments, the HMB comprises about 1, 5, 10, 15, 20, 25, 30, 35, 40, 45, 50, 55, 60, 65, 70, 75, 80, 85, 90, 95 to about 100 hydrophilic side-chains per backbone chain.

In certain embodiments, the HMB comprises a chitosan backbone having a number average molecular weight of about 1 kDa to about 1,000 kDa. In other embodiments, the HMB comprises a chitosan backbone having a number average molecular weight of about 11 kDa. In yet other embodiments, the HMB comprises chitosan backbones having a polydispersity index of about 1.1 to about 5.

In certain embodiments, the HMB comprises polylactide side-chains having a number average molecular weight of about 1 kDa to about 100 kDa. In certain embodiments, the HMB comprise polylactic acid side-chains having a number average molecular weight of about 1, 5, 10, 15, 20, 25, 30, 35, 40, 45, 50, 55, 60, 65, 70, 75, 80, 85, 90, 95 to about 100 kDa.

In one specific embodiment, the HMB comprises polylactide side-chains having a number average molecular weight of about 3.4 kDa.

In yet other embodiments, the HMB comprises polylactide side chains having a polydispersity index of about 1.01 to about 2. In certain embodiments, the HMB comprises polylactide side-chains having a polydispersity index of about 1.01; 1.05, 1.1, 1.15, 1.2, 1.25, 1.3, 1.35, 1.4, 1.45, 1.5, 1.55, 1.6, 1.65, 1.7, 1.75, 1.8, 1.85, 1.95 to about 2.

In certain embodiments, the HMB comprises hydrophilic side-chains having a number average molecular weight of about 1 kDa to about 1,000 kDa. In certain embodiments, the HMB comprises hydrophilic side-chains having a number average molecular weight of about 1, 50, 100, 150, 200, 250, 300, 350, 400, 450, 500, 550, 600, 650, 700, 750, 800, 850, 900, 950 to about 1000 kDa.

In other embodiments, the HMB comprises hydrophilic side-chains having a polydispersity index of about 1.5 to about 3. In certain embodiments, the HMB comprises hydrophilic side-chains having a polydispersity index of about 1.5, 1.6, 1.7, 1.8, 1.9, 2.0, 2.1, 2.2, 2.3, 2.4, 2.5, 2.6, 2.7, 2.8, 2.9 to about 3.

In certain embodiments, the HMB has a number average molecular weight of about 3 kDa to about 2,000 kDa. In certain embodiments, the HMB has a number average molecular weight of about 3, 50, 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950 to about 2000 kDa.

In other embodiments, the HMB has a number average molecular weight of about 12 kDa to about 120 kDa. In other embodiments, the HMB has a number average molecular weight of about 12, 20, 30, 40, 50, 60, 70, 80, 90, 100, 110 to about 120 kDa.

In certain embodiments, the HMB is grafted onto a surface. In other embodiments, the HMB is grafted to a surface via a covalent bond between the backbone polymer and a surface species. In yet other embodiments, the surface species is a polymer deposited on a surface. In one non-limiting embodiment, the HMB is grafted to a poly(glycidyl methacrylate) (PGMA) coating on a surface. In certain embodiments, the surface is a silicon (Si) surface.

In certain embodiments, the properties, surface morphology, and/or structure of the HMB is modified through exposure to solvents of distinct polarity.

Synthesis Methods

In another aspect, the invention provides novel methods of synthesizing HMBs of the invention. In certain embodiments, the method comprises a biphasic solvent synthesis method, whereby different components of the HMB are dissolved in different, at least partially immiscible solvent phases before reacting to form the hybrid molecular brush structure. In other embodiments, at least one of the hydrophobic side-chain polymers and the hydrophilic side-chain polymers is added to the backbone polymer using a biphasic solvent synthesis method. In yet other embodiments, both the hydrophobic side-chain polymers and the hydrophilic side-chain polymers are added to the backbone polymer using biphasic solvent synthesis methods.

In certain embodiments, the method comprises grafting a hydrophobic polymer from a backbone polymer in a biphasic non-emulsion system. In certain embodiments, a backbone polymer is in a polar solvent, providing a first solution. In other embodiments, a hydrophobic side-chain polymer precursor is in a non-polar solvent, providing a second solution. The first solution is contacted with the second solution, and reacted until a homogeneous solution is formed. The resulting homogeneous solution comprises the HMB, comprising the backbone polymer covalently bound to at least one hydrophobic side-chain polymer, which can be isolated. In certain embodiments, the first solution and second solution are immiscible upon first contact.

In certain embodiments, the backbone polymer does not comprise at least one hydrophilic side-chain polymer. In other embodiments, the backbone polymer comprises at least one hydrophilic side-chain polymer.

In certain embodiments, the backbone polymer (which comprises at least one hydrophilic side-chain polymer, or which does not comprise at least one hydrophilic side-chain polymer) is in a non-polar solvent, providing a third solution. In other embodiments, the hydrophilic side-chain polymer precursor is in a polar solvent, providing a fourth solution. The third and fourth solutions are contacted, where a homogeneous solution forms, comprising a backbone polymer covalently bound to at least one hydrophilic side-chain polymer (the HMB), which can be isolated from the solution. In certain embodiments, the third solution and fourth solution are immiscible upon first contact.

In certain embodiments, attachment of the at least one hydrophilic side-chain polymer to the backbone polymer takes place before attachment of the at least one hydrophilic side-chain polymer to the backbone polymer.

In certain embodiments, attachment of the at least one hydrophilic side-chain polymer to the backbone polymer takes place after attachment of the at least one hydrophilic side-chain polymer to the backbone polymer.

In certain embodiments, the first solution and second solution do not form an emulsion. In other embodiments, the third solution and fourth solution do not form an emulsion.

In certain embodiments, the hydrophobic side-chain polymer precursor is selected from the group consisting of D-lactide, L-lactide, D,L-lactide, glicolide, ε-caprolactone, γ-butyrolactone, and δ-valerolactone.

In certain embodiments, the hydrophilic side-chain polymer precursor is N-vinyl pyrrolidone (NVP).

In certain embodiments, at least one of the first solution, second solution, third solution, and fourth solution further comprises a polymerization initiator. In other embodiments, the polymerization initiator is selected from, but not necessarily limited to, the group consisting of 2,2'-Azobisisobutyronitrile (AIBN), 1,1'-Azobis(cyclohexanecarbonitrile), 2,2'-Azobis[2-(2-imidazolin-2-yl)propane]dihydrochloride, 2,2'-Azobis[N-(2-carboxyethyl)-2-methylpropionamidine), 4,4'-Azobis(4-cyanovaleric acid), 2,2'-Azobis(4-methoxy-2,4-dimethylvaleronitrile), 1,1'-Azobis(cyclohexane-1-carbonitrile), 2,2'-Azobis(2,4-dimethylvaleronitrile), dilauroyl peroxide, di(4-methylbenzoyl)peroxide, tert-Butyl peroxyisobutyrate, 1,1-di(tert-butylperoxy)cyclohexane, and dibenzoyl peroxide.

In certain embodiments, each polar solvent is independently selected from any polar solvents common in the art. In other embodiments, the polar solvents are each independently selected from the group consisting of methanesulfonic acid, camphorsulfonic acid, benzenesulfonic acid, and p-toluenesulfonic acid.

In certain embodiments, each non-polar solvent is independently selected from any non-polar solvents common in the art. In other embodiments, the non-polar solvents are each independently selected from the group consisting of dichloromethane, chloroform, toluene, 1,4-dioxane, ethyl acetate, butyl acetate, anisole, and methyl ethyl ketone.

Methods of Use

Tissue Engineering

In another aspect, the invention provides methods of using the HMBs of the invention for tissue engineering applications. In certain embodiments, the HMB is contacted to a wound on a subject, such as $1^{st}$ or $2^{nd}$ degree burns, to promote wound healing.

In certain embodiments, the HMBs are cast into a construct selected from the group consisting of, but not limited to, films, patches and grafts. In other embodiments, the HMB construct comprises at least one antibiotic. In yet other embodiments, the HMB construct comprises at least one growth factor.

Without intending to be limited to any particular theory, the availability and switching of both polar and non-polar groups and switching properties allows the entrapment of a wide range of antibiotics and growth factors to help prevent infection and promote wound healing. Examples of antibiotics include, but are not limited to, Polymyxin B Sulfate, Bacitracin, and Neomycin. Examples of growth factors include, but are not limited to, Bone Morphogenetic Protein (BMP), Epidermal Growth Factor (EGF), and Vascular Endothelial Growth Factor (VEGF).

Drug Delivery

In another aspect, the invention provides methods of using the HMBs of the invention for drug delivery applications.

In certain embodiments, the HMBs can be spray-dried as microparticulates entrapping drug for depot therapy. In other embodiments, the HMB and drug are dissolved in an appropriate solvent, and the mixture is then spray-dried to enable encapsulation and microsphere formation. In yet other embodiments, the drug is a hydrophobic drug or a hydrophilic drug. During the drying phase of the spray-drying process, switching between polar and non-polar groups may occur depending on the polarity of the drug being entrapped. Without intending to be limited to any particular theory, this versatility of the HMBs to entrap both hydrophilic and hydrophobic drugs can lower formulation development costs, scale-up, and commercialization. Examples of drugs used for depot therapy include, but are not limited to, Haloperidol, Risperidone, Aripiprazole, Etonogestrel and Goserelin.

Definitions

As used herein, each of the following terms has the meaning associated with it in this section.

Unless defined otherwise, all technical and scientific terms used herein generally have the same meaning as commonly understood by one of ordinary skill in the art to which this invention belongs. Generally, the nomenclature used herein and the laboratory procedures in polymer chemistry and materials science are those well-known and commonly employed in the art.

Abbreviations used herein include: 1H-NMR=proton nuclear magnetic resonance spectroscopy; 4-DMAP=4-dimethylaminopyridine; AAm=acrylamide, AcGlcN=N-acetyl-D-glucosamine; AFM=atomic force microscopy; APS=ammonium persulfate; CA=contact angle; CHI=chitosan; CHI-g-PLA=chitosan grafted with polylactide; DCM=dichloromethane; DSC=Differential Scanning Calorimetry; FTIR=Fourier transform infrared spectroscopy; GlcN=.glucosamine hydrochloride; GPC=Gel permeation chromatography; HMB=hybrid molecular brush; HMB1=CHI-g-PLA-g-PNVP; HMB2=CHI-g-PLA-g-PAAm; kDa.=.kilodalton; Mn=number average molecular weight; MSA=methanesulfonic acid; Mw=weight average; NVP=N-vinyl pyrrolidone; PAAm=polyacrylamide; PDI=polydispersity index; PGMA=poly(glycidyl methacrylate); PLA=polylactide or polylactic acid; PNVP=poly-N-vinyl pyrrolidone; ROP=ring opening polymerization; Si=silicon; THF=tetrahydrofuran; TGA=Thermogravimetric analysis.

As used herein, the articles "a" and "an" refer to one or to more than one (i.e. to at least one) of the grammatical object of the article. By way of example, "an element" means one element or more than one element.

As used herein, the term "about" will be understood by persons of ordinary skill in the art and will vary to some extent on the context in which it is used. As used herein when referring to a measurable value such as an amount, a concentration, a temporal duration, and the like, the term "about" is meant to encompass variations of +20% or +10%, more preferably +5%, even more preferably +1%, and still more preferably +0.1% from the specified value, as such variations are appropriate to perform the disclosed methods.

The term "monomer" refers to any discreet chemical compound of any molecular weight.

The term "molecular brush" refers to a backbone polymer chain covalently bound to at least on side polymer chain. In certain embodiments, the side polymer chain is hydrophobic, hydrophilic or amphiphilic. The term "hybrid molecular brush" refers to a molecular brush comprising at least one hydrophobic side polymer chain and at least one hydrophilic side polymer chain, both covalently bound to the backbone polymer chain.

As used herein, the term "polymer" refers to a molecule composed of repeating structural units typically connected by covalent chemical bonds. The term "polymer" is also meant to include the terms copolymer and oligomers. In certain embodiments, a polymer comprises a backbone (i.e., the chemical connectivity that defines the central chain of the polymer, including chemical linkages among the various polymerized monomeric units) and a side-chain (i.e., the chemical connectivity that extends away from the backbone).

As used herein, the term "polymerization" or "crosslinking" refers to at least one reaction that consumes at least one functional group in a monomeric molecule (or monomer), oligomeric molecule (or oligomer) or polymeric molecule (or polymer), to create at least one chemical linkage between at least two distinct molecules (e.g., intermolecular bond), at least one chemical linkage within the same molecule (e.g., intramolecular bond), or any combinations thereof. A polymerization or crosslinking reaction may consume between about 0% and about 100% of the at least one functional group available in the system. In certain embodiments, polymerization or crosslinking of at least one functional group results in about 100% consumption of the at least one functional group. In other embodiments, polymerization or crosslinking of at least one functional group results in less than about 100% consumption of the at least one functional group.

Throughout this disclosure, various aspects of the invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range and, when appropriate, partial integers of the numerical values within ranges. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Those skilled in the art will recognize, or be able to ascertain using no more than routine experimentation, numerous equivalents to the specific procedures, embodiments, claims, and examples described herein. Such equivalents were considered to be within the scope of this invention and covered by the claims appended hereto. For example, it should be understood, that modifications in reaction conditions, including but not limited to reaction times, reaction size/volume, and experimental reagents, such as solvents, catalysts, pressures, atmospheric conditions, e.g., nitrogen atmosphere, and reducing/oxidizing agents, with art-recognized alternatives and using no more than routine experimentation, are within the scope of the present application.

It is to be understood that wherever values and ranges are provided herein, all values and ranges encompassed by these values and ranges, are meant to be encompassed within the scope of the present invention. Moreover, all values that fall within these ranges, as well as the upper or lower limits of a range of values, are also contemplated by the present application.

The following examples further illustrate aspects of the present invention. However, they are in no way a limitation of the teachings or disclosure of the present invention as set forth herein.

EXAMPLES

The invention is now described with reference to the following Examples. These Examples are provided for the purpose of illustration only, and the invention is not limited to these Examples, but rather encompasses all variations that are evident as a result of the teachings provided herein.

Without further description, it is believed that one of ordinary skill in the art can, using the preceding description and the following illustrative examples, make and utilize the compounds of the present invention and practice the claimed methods. The following working examples therefore, specifically point out the preferred embodiments of the present invention, and are not to be construed as limiting in any way the remainder of the disclosure.

Materials and Methods
Materials

Medium molecular weight chitosan (Brookfield viscosity 200-800 cP for 1% w/v of CHI in 1% acetic acid solution; 75-85% deacetylated; $M_v$=190-310 kDa) was used without further purification (Sigma-Aldrich). D,L-Lactide (3,6-dimethyl-1,4-dioxane-2,5-dione) was recrystallized from toluene prior to use (Sigma-Aldrich). Poly(glycidyl methacrylate) (PGMA), methanesulfonic acid (MSA, ≥99.5%), 4-dimethylaminopyridine (4-DMAP, ≥99%), N-vinyl pyrrolidone (NVP, ≥99%), azobisisobutyronitrile (AIBN, 98%), glucosamine hydrochloride (GlcN.HCl), N-acetyl-D-glucosamine (AcGlcN), acrylamide (AAm, ≥99%), ammonium persulfate (APS, ≥99%), were purchased from Sigma-Aldrich and used without further purification. Dichloromethane (DCM, CHROMASOLV, 99.8%), tetrahydrofuran (THF), anisole (99.7%), ethanol (anhydrous, 99%) and ammonium hydroxide (35%) (ACS reagent) were purchased from Sigma-Aldrich. All the glassware used for recrystallization of lactide and synthesis of CHI-g-PLA was washed and dried at 120° C. under vacuum overnight. Mica substrates (Grade VI) were purchased from Ted Pella, Inc. Mica wafers were cleaved by Scotch tape to reveal a clean and unused layer. Silicon wafers of {100} orientation were acquired from Addison Engineering.

Synthesis of CHI-g-PLA

Chitosan (CHI) (0.3 g) was dissolved in methanesulfonic acid (MSA) (3 g, 31.22 mmol) by stirring and intermittent sonication at room temperature. In a separate flask, 4-dimethylaminopyridine (4-DMAP) (0.273 g, 2.23 mmol) and D,L-lactide (10.8 g, 74.93 mmol) were dissolved in dichloromethane (DCM) (70 g). The DCM phase was added slowly to the MSA phase. The contents were stirred at 200 rpm and room temperature for 72 h until a homogenous phase was obtained. The resulting copolymer was precipitated in absolute ethanol, dissolved in DCM, and re-precipitated from absolute ethanol twice for further purification. The resulting copolymer was dried at room temperature under vacuum. Linear poly lactic acids (PLAs) were synthesized by the same process using glucosamine hydrochloride (GlcN.HCl) and N-acetyl-D-glucosamine (AcGlcN) as initiators and used as model homopolymers. This process is depicted in FIG. 1A.

Degradation of CHI in the Presence of MSA

Figure 1B:
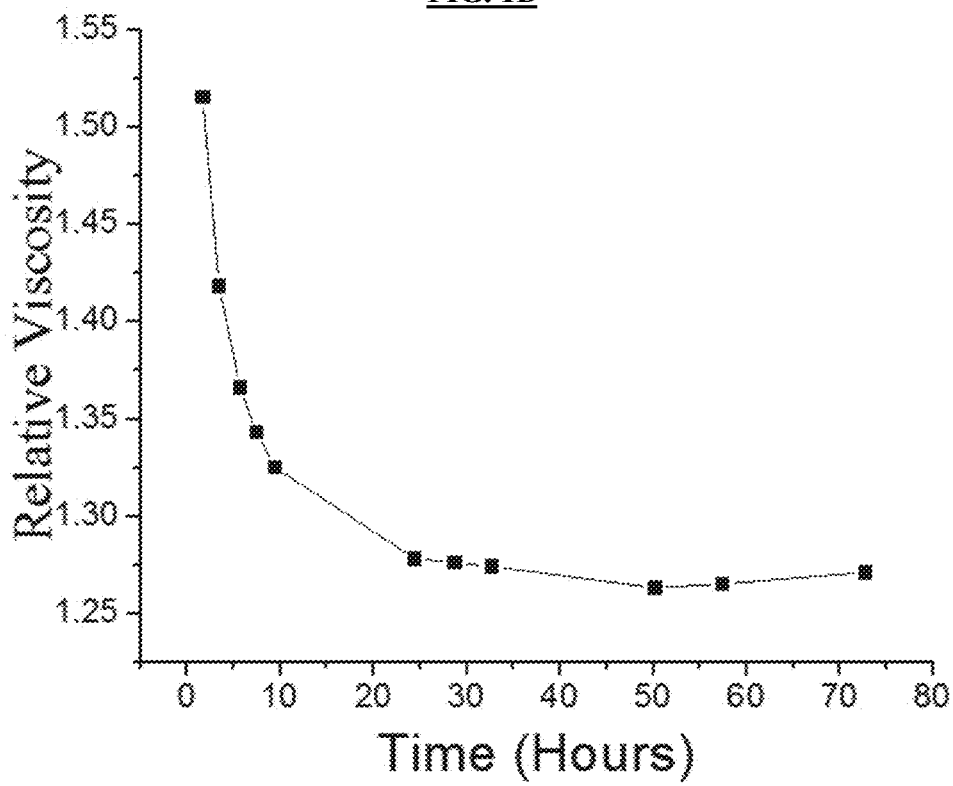
FIG. 1B is a graph showing that the relative viscosity of CHI in MSA at 25° C. becomes constant after ~24 h.
Figure 1C:
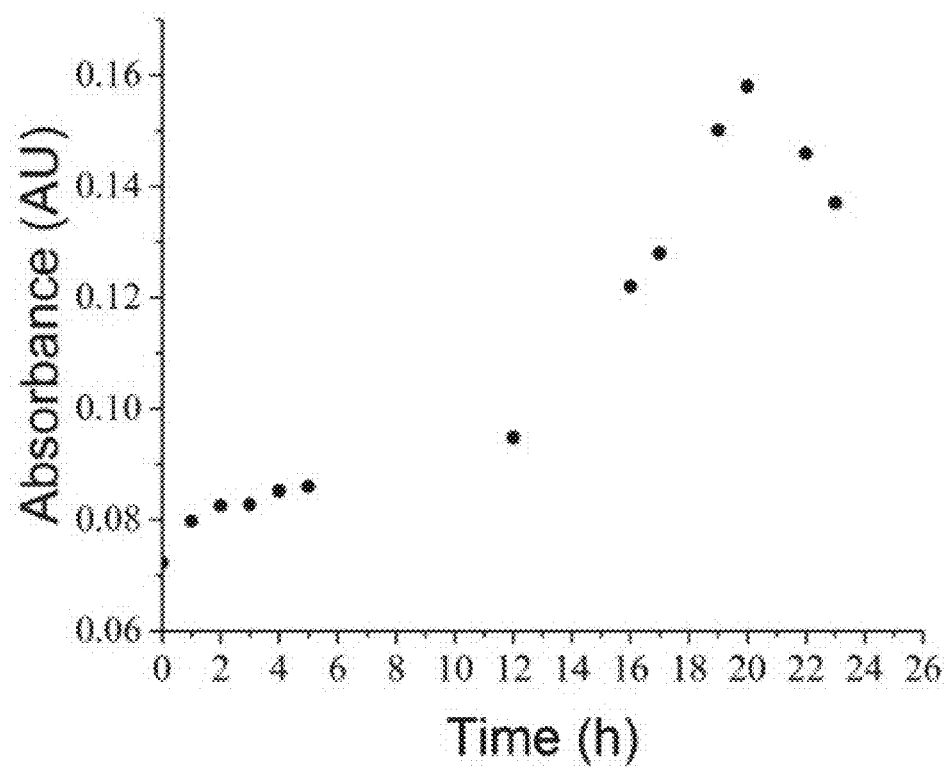
FIG. 1C is a graph showing the concentration of Maillard reaction intermediates during chitosan degradation as measured by UV-Vis absorbance spectroscopy at 294 nm.

The degradation of chitosan (CHI) in the presence of methanesulfonic acid (MSA) was evaluated by viscosity measurements. Freshly prepared 2.5% w/v solution of CHI in MSA was placed in an Ostwald viscometer at 25° C. Viscosity measurements were repeated over 72 hours. A decrease in the relative viscosity of CHI was observed during the first 24 h, after which it stabilized to a constant value (FIG. 1B). Without intending to be limited to any particular theory, this behavior can be attributed to the degradation of CHI chains. UV-vis spectroscopy kinetics at the wavelength of 294 nm has been employed to follow the formation of Schiff-base compounds, which are Maillard reaction intermediates (FIG. 1C). The peak value of the Maillard intermediate concentration was reached after 20 hours. This time indicated complete degradation of the CHI chains.

Synthesis of Neat PLA

Neat PLA was synthesized by the same method as described above, with either GlcN or AcGlcN as initiators instead of CHI. The polymer was as a control for GPC, FTIR, and NMR analysis.

Synthesis of HMB1 (CHI-g-PLA-g-PNVP)

Figure 2:
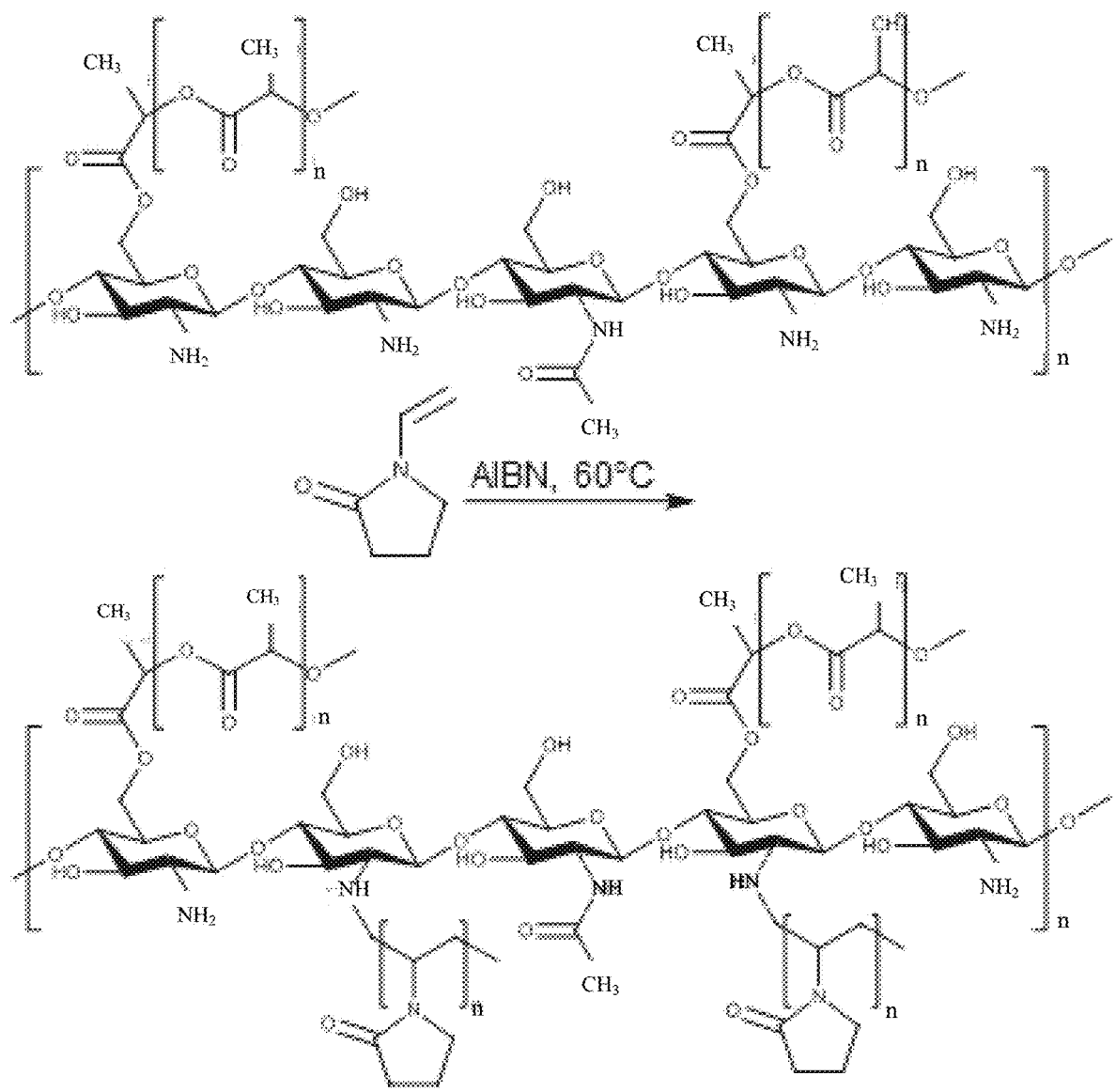
FIG. 2 is a schematic for synthesis of CHI-g-PLA-g-PNVP (also known as HMB1) by grafting PNVP from the CHI of CHI-g-PLA in the course of radical polymerization of NVP with AIBN as an initiator.

CHI-g-PLA (0.5 g), N-vinyl pyrrolidone (NVP) (5 g) and azobisisobutyronitrile (AIBN) (0.5 g) were dissolved in anisole. The solution was purged with argon for 15 minutes at room temperature, followed by heating in an oil bath at 60° C. for 5 h. A mixture of acetone and 2-3 drops of 12 N HCl was added to induce precipitation via protonation of the poly N-vinyl pyrrolidone (PNVP). The resulting precipitate was dispersed in water, neutralized with ammonium hydroxide and re-precipitation in acetone twice. Neat PNVP was synthesized using the same process with AIBN as the catalyst and used as reference. The process of synthesis of HMB1 is shown in FIG. 2.

Synthesis of HMB2 (CHI-g-PLA-g-PAAm)

Figure 3:
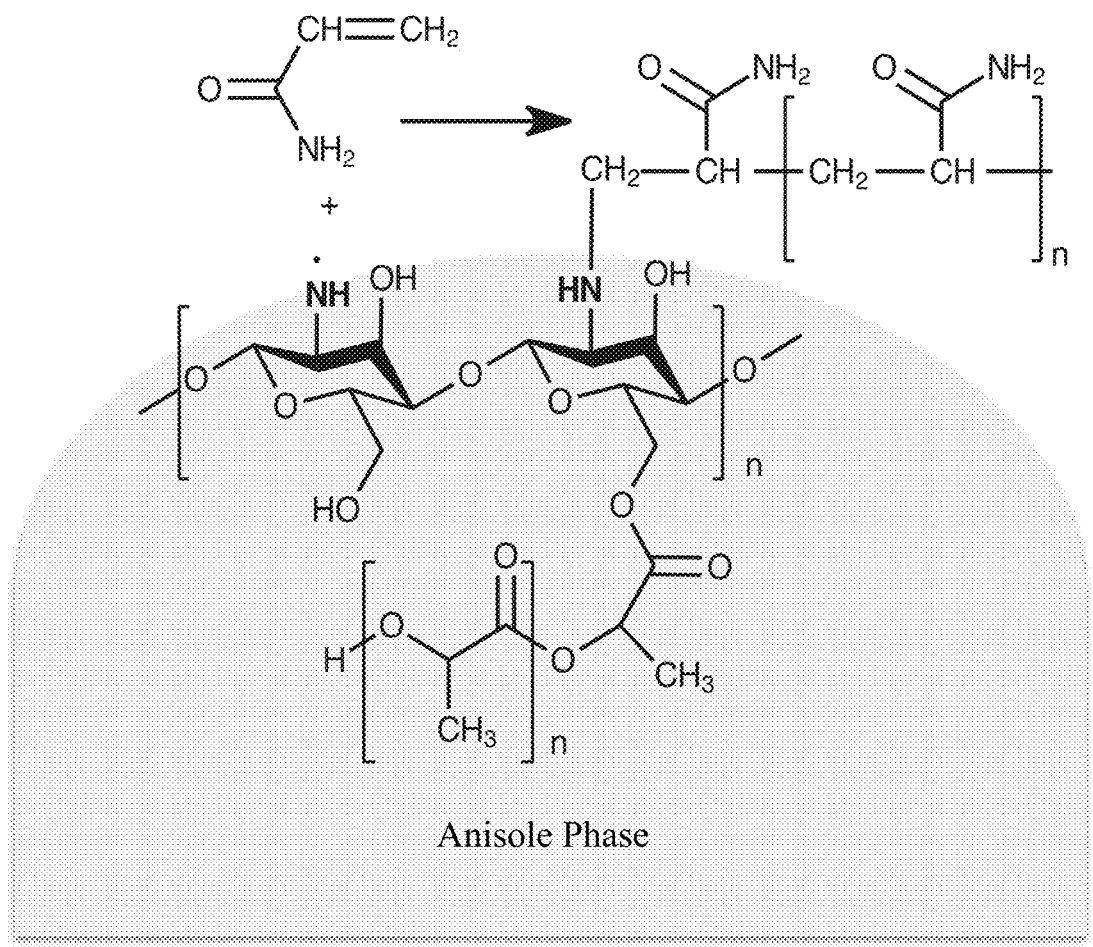
FIG. 3 is a schematic for the synthesis of CHI-g-PLA-g-PAAm (also known as HMB2) using radical polymerization using a water/anisole emulsion and APS as an initiator.

CHI-g-PLA (2.5 g) was dissolved in 50 mL anisole. Acrylamide (AAm) (2.5 g) and ammonium persulfate (APS) (0.5 g) were dissolved in 50 mL water. The two phases were combined in a round-bottom flask at 1:1 volume ratio, shaken vigorously and sonicated for 10 minutes to form an emulsion. The emulsion was purged with argon for 10 minutes, followed by sonication for an additional 10 minutes. This process was repeated twice, followed by heating to 60° C. for 5 hours with constant stirring to enable polymerization. The emulsion was added to 200 mL of methanol to induce precipitate formation. The resulting HMB was dispersed in water and re-precipitated twice with methanol to eliminate unreacted acrylamide and ungrafted poly acrylamide (PAAm). PAAm homopolymer was synthesized via radical polymerization of AAm with APS as initiator. FIG. 3 shows a scheme for the synthesis of CHI-g-PLA-g-PAAm.

Molecular Weight Characterization of CHI-g-PLA

Gel permeation chromatography (GPC) was used to determine the molecular weight of the CHI-g-PLA and the PLA initiated from GlcN and AcGlcN. GPC analysis was performed using a Perkin-Elmer Series 200 HPLC/GPC with a 785A UV/VIS detector set at 210 nm. The column used was a T4000 (single-pore GPC/SEC column for samples soluble in organic solvents) from Malvern Instruments. THF was used as the mobile phase for analysis. 1% solutions of CHI-g-PLA and PLA initiated from GlcN and AcGlcN were made in THF, filtered through a 0.2 m filter, and used for GPC. The flow rate for analysis was 1 mL/min at 40° C., and the sample size was 40 μL. The retention times of the GPC column were calibrated against a set of polystyrene standards of molecular weights 3470 Da, 9600 Da, 28,000 Da, 100,000 Da and 200,000 Da.

NMR Spectroscopy of CHI-g-PLA $^1$H-NMR was performed at 400 MHz in $CDCl_3$, using a Bruker Avance III spectrometer with TopSpin software. Spectra of synthesized polymers were compared to initiator spectra of GlcN (in DMSO-$d_6$) and AcGlcN (in DMSO-$d_6$).

Static Light Scattering (SLS) of CHI-g-PLA

Static light scattering of CHI-g-PLA was performed using a Zetasizer Nano-ZS (Malvern Instruments) fitted with a 633 nm laser. A series of dilutions of CHI-g-PLA were made in THF (0.1-1.0 mg/mL) and used for SLS. Samples were filtered through a 0.2 m filter and stored overnight prior to performing measurements.

FTIR Spectroscopy of CHI-g-PLA, HMBs and their Constituent Polymers

FTIR measurements were performed using a Thermo Nicolet Avatar 370 spectrometer.

Thermal Analysis of CHI-g-PLA, HMBs and their Constituent Polymers

Differential Scanning Calorimetry (DSC) of CHI-g-PLA, HMB, CHI, PLA, and PNVP was performed using the DSC822 (Mettler Toledo) with nitrogen as the purge gas at a flow rate of 20 mL/min. 3-5 mg of polymers were weighed into a 40 μL aluminum pan and hermetically sealed using a crimping device and subjected to heating between 0° C. and 200° C. at 10° C./min. An empty pan was used as the reference. Thermogravimetric analysis (TGA) was performed with TGA/SDTA851$^e$ (Mettler Toledo) with nitrogen as the purge gas at a flow rate of 20 mL/min. 5-10 mg samples were weighed in a 70 μL alumina crucible and subjected to heating from 25° C. to 200° C. at 10° C./min.

Analysis of CHI-g-PLA and HMBs' Morphology Using Atomic Force Microscopy

A 0.1% solution of CHI-g-PLA in THF was filtered through a 0.2 m syringe filter. A few drops were placed on mica such that the entire surface was covered, followed by spinning at 3,000 rpm to evaporate the solvent. For HMB1 (CHI-g-PLA-g-PNVP), a similar process was used except that an emulsion with equal volumes of anisole/water was used for the coating. For HMB2 (CHI-g-PLA-g-PAAm), depositions on mica were made by spin coating at 3000 rpm from a 0.01% dispersion in water. An Innova (Veeco Metrology) scanning probe microscope in the tapping mode was used for the AFM studies. WSxM software by Nanotec Electronica was used to treat and analyze the AFM images.

Evaluation of HMBs Switching by "Grafting on" PGMA-Modified Silicon (Si) Wafers

Si wafers were cleaned by sonication with DCM, methanol and DI water for 15 minutes each, followed by cleaning with piranha solution (25% hydrogen peroxide, 25% ammonium hydroxide, and 50% DI water). The Si wafers were then dried with argon. The surface was modified with PGMA deposited by spin coating with a 0.2% solution in chloroform. HMBs were deposited on the Si wafer from 1% dispersions in water. The HMB was tethered to the PGMA by placing the Si wafers at 120° C. for 1 h. Ungrafted HMBs were rinsed off with water and dried with argon. The thickness of the films was determined using a null ellipsometer. Water contact angle (CA) measurements were made using the sessile drop method.

After HMB tethering to PGMA, the "grafted on" Si wafer was placed in water (dielectric constant=80.1) to switch to the hydrophilic component of the HMB. The surface was dried with argon before measuring water CA. The surface was then exposed to methanol (dielectric constant=32.7) as an intermediate solvent for gradual switching. The Si wafer surface was dried with argon and the water CA was measured. The wafer was then placed in anisole (dielectric constant=4.33) to expose the hydrophobic component of the HMB. The Si wafer was dried with argon and the water CA was measured. An Innova (Veeco Metrology) scanning probe microscope in the tapping mode was used for the AFM studies. WSxM software by Nanotec Electronica was used to treat and analyze the AFM images.

Example 1: Synthesis of CHI-g-PLA

Figures 4A, 4B, 4C:
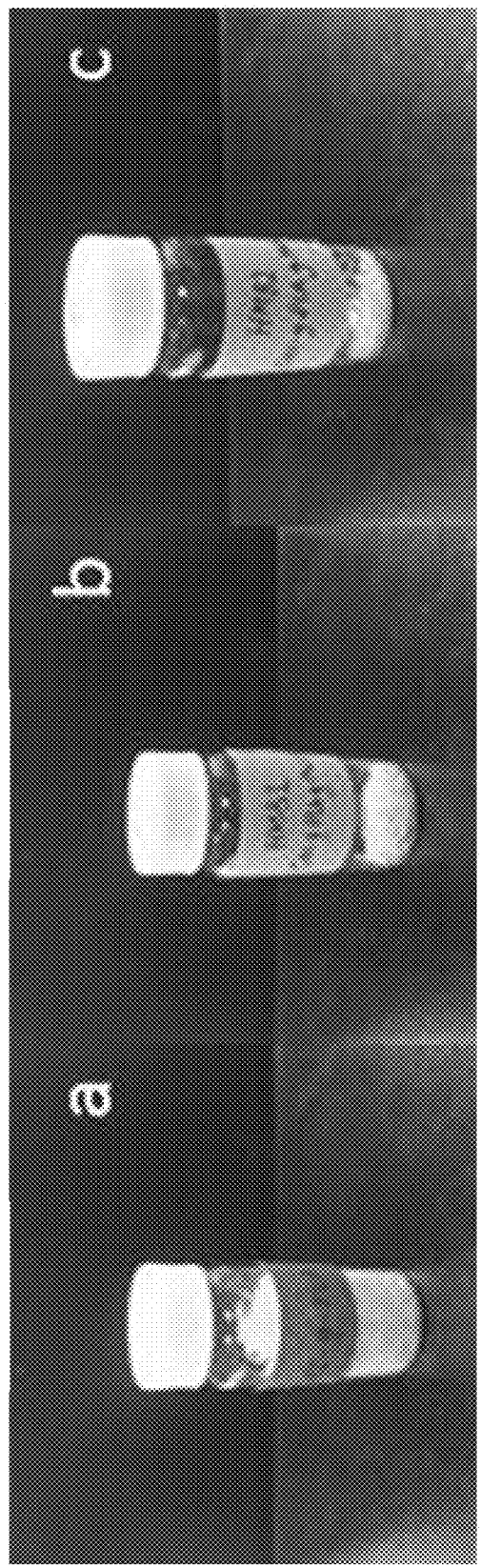
FIGS. 4A-4C are photographs of HMB materials of the invention.

CHI-g-PLA was synthesized as an odorless, pale yellow solid as seen in FIG. 4A. The material was soluble in DCM, chloroform, and THF at room temperature. It was soluble in anisole at 60° C.

MSA and DCM were the two solvents selected for the synthesis of the CHI-g-PLA due to their particular properties. Although these solvents are miscible when pure, they are immiscible when CHI is dissolved in MSA and 4-DMAP in DCM. Without intending to be limited to any particular theory or mechanism, when these two immiscible solutions are brought together, 4-DMAP forms a salt with MSA, thereby activating the monomer by hydrogen bonding, resulting in the opening of the lactide ring. Ring opening polymerization (ROP) proceeds through the cleavage of the acyl bond. Propagation of the PLA chain takes place by nucleophilic attack of the oxygen of the newly opened lactide ring on an activated lactide.

Without intending to be limited to any particular theory, the MSA-DMAP system may cause the dual activation of both the macroinitiator CHI and the lactide monomer. Hence, a proper balance between MSA and 4-DMAP can be crucial to the synthesis. The initiation of grafting on CHI takes place at the solvent interphase. As ROP proceeds and a sufficient fraction of PLA is grafted onto CHI, the resulting copolymer dissolves in DCM, causing the formation of a homogeneous phase after 24-36 h of reaction. In separate experiments, PLA was synthesized using GlcN and AcGlcN to determine whether CHI's hydroxy groups act as initiators. Although the PLA formation was similar, a single homogeneous phase was seen within the first 2 hours of the reaction, as formed PLA is readily soluble in DCM.

The degradation of neat CHI in 2.5% MSA was studied at room temperature using UV-Vis absorption spectroscopy. CHI dissolved in MSA was yellow in color, but showed a browning upon prolonged incubation due to the Maillard reaction. The Maillard reaction is a non-enzymatic reaction that occurs due to condensation of carbonyl of reducing sugars and amino groups of nitrogen containing compounds. A lowering in the relative viscosity of CHI was also observed up to 24 h, after which the viscosity stabilized to a constant value (FIG. 1B). This lowering in viscosity was attributed to the degradation of CHI chains and formation of Schiff-base compounds, which are Maillard reaction intermediates. The degradation rate and estimation of the molecular weight of CHI backbone are shown in FIG. 1C. Calculation of CHI Molecular Weight after Degradation in MSA The degradation of CHI in MSA was conducted under the assumption that complete degradation occurred within 20-24 h. The concentration of the intermediates was taken as the increase in absorbance after 20 h:

$$A_{20h} - A_{0h} = 0.158 \text{ a.u.} - 0.0723 \text{ a.u.} = 0.0857 \text{ a.u.}$$

Based on the measured yield, the fraction of CHI in CHI-g-PLA was determined as 12%. Hence, the degradation of CHI during the synthesis of CHI-g-PLA was calculated as shown in equation (1).

$$\frac{A_{100\% CHI-g-PLA} - A_{12\% CHI \text{ with no degradation}}}{A_{12\% CHI \text{ on complete degradation}}} = 0.021 \quad (1)$$

For the purpose of calculating the degree of polymerization (DP), the molecular weight of CHI was estimated to be 190,000 Da. Assuming an average deacetylation degree of 80% and molecular weights of GlcN and AcGlcN to be 179.17 g/mol and 221.21 g/mol respectively, the DP was calculated to be 1020. Based on these estimates, an average CHI molecule with no degradation had one fragment (chain), 1020 units long (1×1020). In contrast, a completely degraded CHI (conversion S=1) had 1020 chains or fragments (1020×1) that are one unit long. Similarly, a chain with the degradation degree of 0.021 was broken into 21 chains (1020×0.021), each 49 monomeric units long with molecular weight of 9200 Da.

Molecular Weight Characterization of CHI-g-PLA by GPC and SLS

The CHI-g-PLA showed a number average molecular weight ($M_n$) of 44 kDa and a weight average ($M_w$) of 61.6 KDa from which polydispersity index (PDI) was calculated to be 1.4. A second peak was seen at 72 h which corresponds to the ungrafted PLA with $M_n$ of 3.4 kDa. Neat PLA initiated from GlcN had a $M_n$ 2.5 kDa and a $M_w$ of 3.6 kDa. Neat PLA initiated from AcGlcN had a $M_n$ of 7.9 kDa and a $M_w$ of 13 kDa. These results are summarized in Table 1. Pure CHI is insoluble in THF, which was used as the mobile phase for GPC studies. Therefore direct comparison between CHI-g-PLA and CHI was not feasible.

TABLE 1

Molecular weights and polydispersity index (PDI) of CHI-g-PLA and neat PLAs (synthesized as controls) as determined by GPC.

| | $M_n$, Da | $M_w$, Da | PDI |
|---|---|---|---|
| CHI-g-PLA | 44,181 | 61,997 | 1.4 |
| Ungrafted PLA seen at 72 h | 3,479 | 4,997 | 1.43 |
| Neat PLA from GlcN | 2,543 | 3,667 | 1.44 |
| Neat PLA from AcGlcN | 7,950 | 13,204 | 1.66 |

Figure 5A:
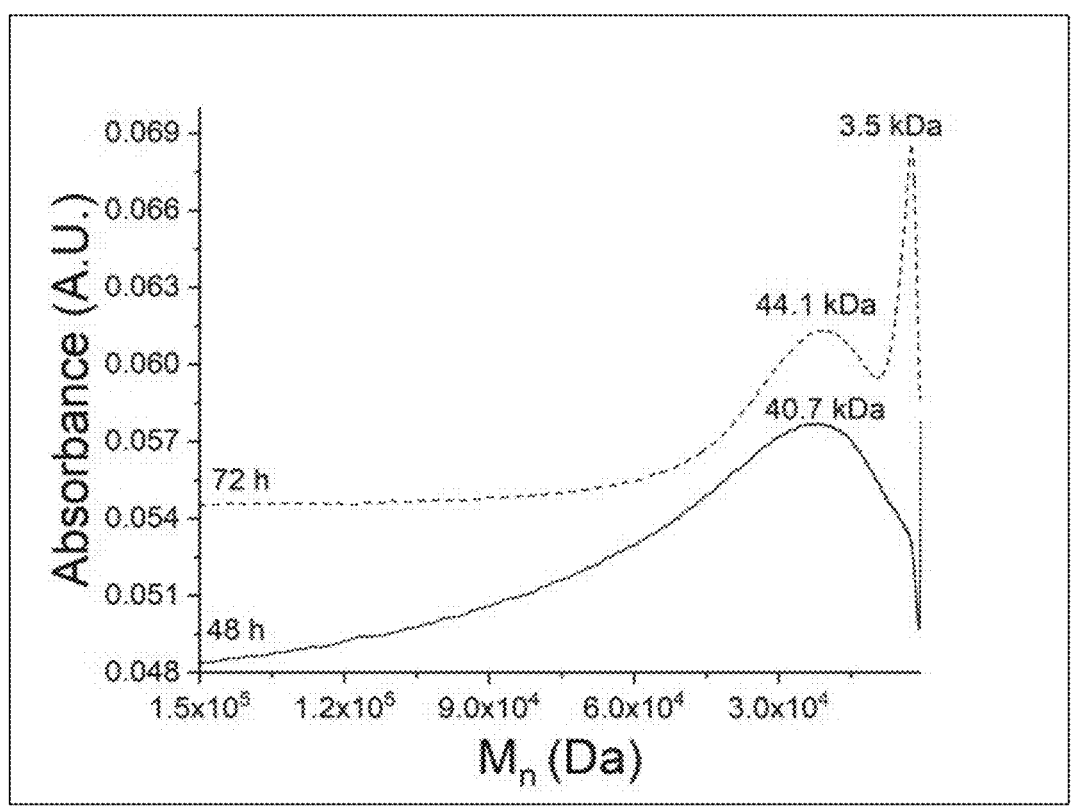
FIG. 5A is a set of GPC traces depicting the molecular weight of CHI-g-PLA after grafting for 48 h and 72 h.
Figure 5B:
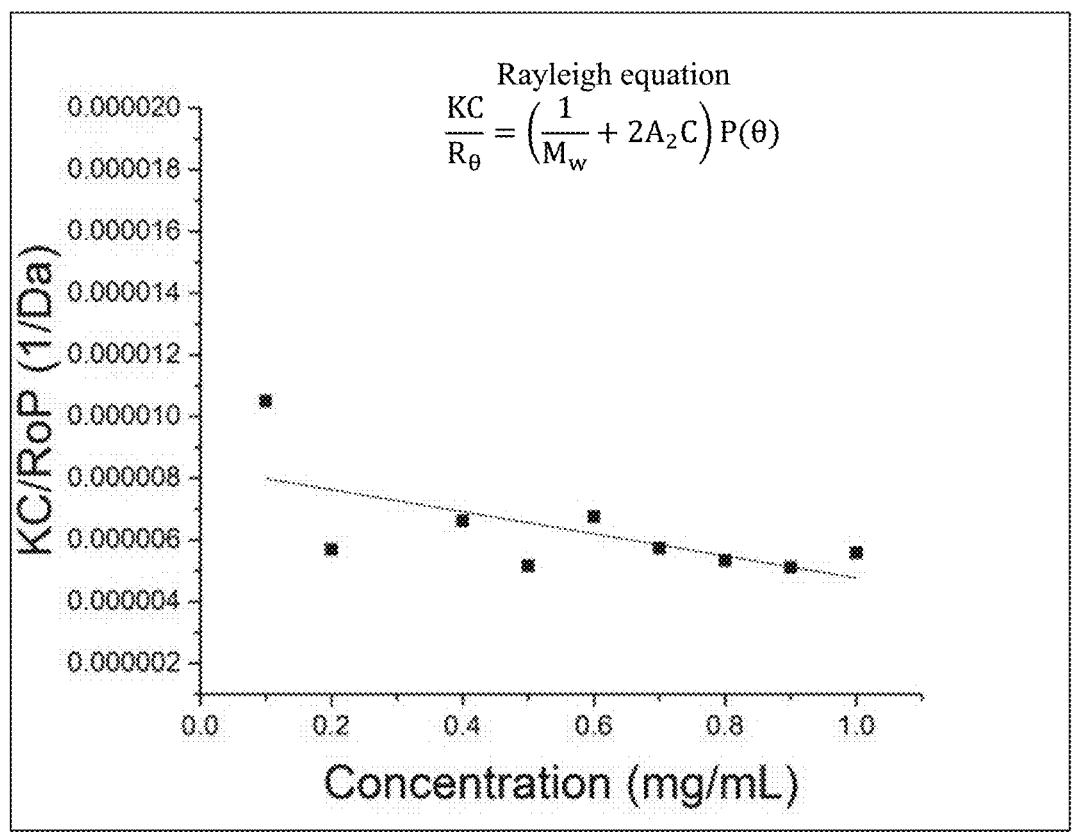
FIG. 5B is a Debye plot for CHI-g-PLA in THF obtained from static light scattering. Based on the Rayleigh equation, the inverse of y-intercept gives $M_w$=119 kDa and second virial coefficient, $A_2$=−0.001789 mL mol/$g^2$.

SLS was performed in addition to GPC to confirm the GPC data. FIG. 5B shows the results of the molecular weight determination through GPC and SLS.

The grafting density was calculated to be 9-10 chains of PLA per CHI chain based on Equation (2). $M_n^{CHI-g-PLA}$ chains was taken as 44 kDa, $M_n^{CHI}$ was 11 kDa, and $M_n^{PLA}$ was taken to be 3.4 kDa.

$$N_{PLA} = \frac{(M_n^{CHI-g-PLA} - M_n^{CHI})}{M_n^{PLA}} \quad (2)$$

After 48 and 72 hours of polymerization, GPC showed a $M_n$ of about 41 and 44 kDa for CHI-g-PLA respectively. A substantial increase of a low molecular weight component of the polymerization composition at 72 h was observed. The lower molecular weight component was observed at 3500 Da, and was assigned as ungrafted PLA based on the hypothesis that a growing fraction of grafted PLA resulted in ample saturation of the backbone. The lower molecular weight component also matches the $M_n$ of the model PLA obtained under identical conditions initiated from GlcN. The parallel SLS measurements yielded a $M_w$ for CHI-g-PLA at 119 kDa, which is slightly higher than the $M_w$ obtained from GPC. SLS measurement also provided thermodynamic behavior of a polymer in solution as indicated by the second virial coefficient ($A_2$). Since THF is a poor solvent for CHI, it is believed that the backbone of the molecular brush adopted a collapsed conformation in THF. This hypothesis is supported by the negative value of $A_2$ obtained in the SLS measurements of the CHI-g-PLA samples.

NMR Spectrum of CHI-g-PLA

Figure 6A:
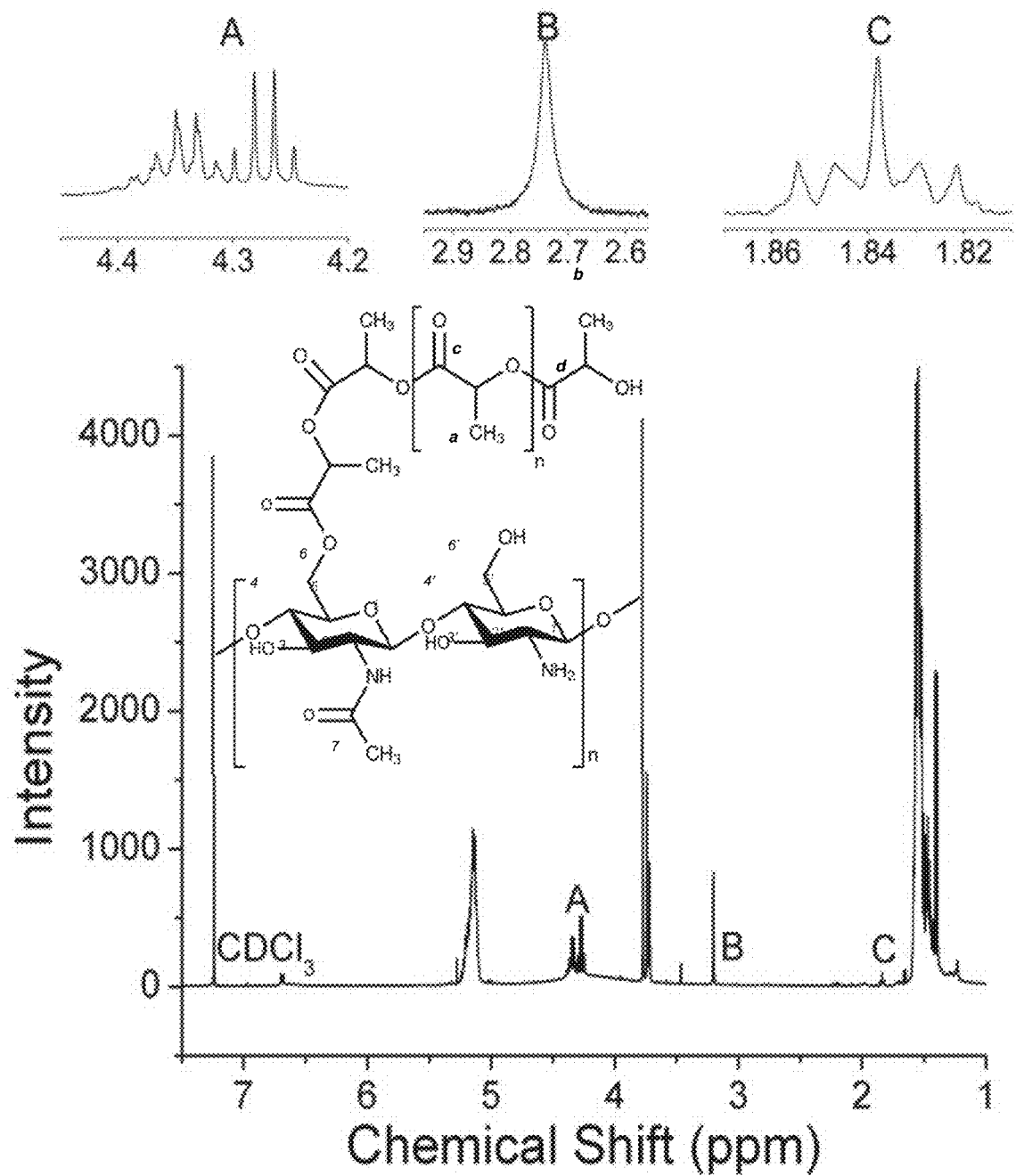
FIG. 6A is a $^1$H-NMR spectrum of CHI-g-PLA (CDCl$_3$; 400 MHz) with insets: inset A is a multiplet at 4.34 ppm, inset B is a singlet at 2.73 ppm, and inset C is a multiplet at 1.838 ppm.
Figure 6B:
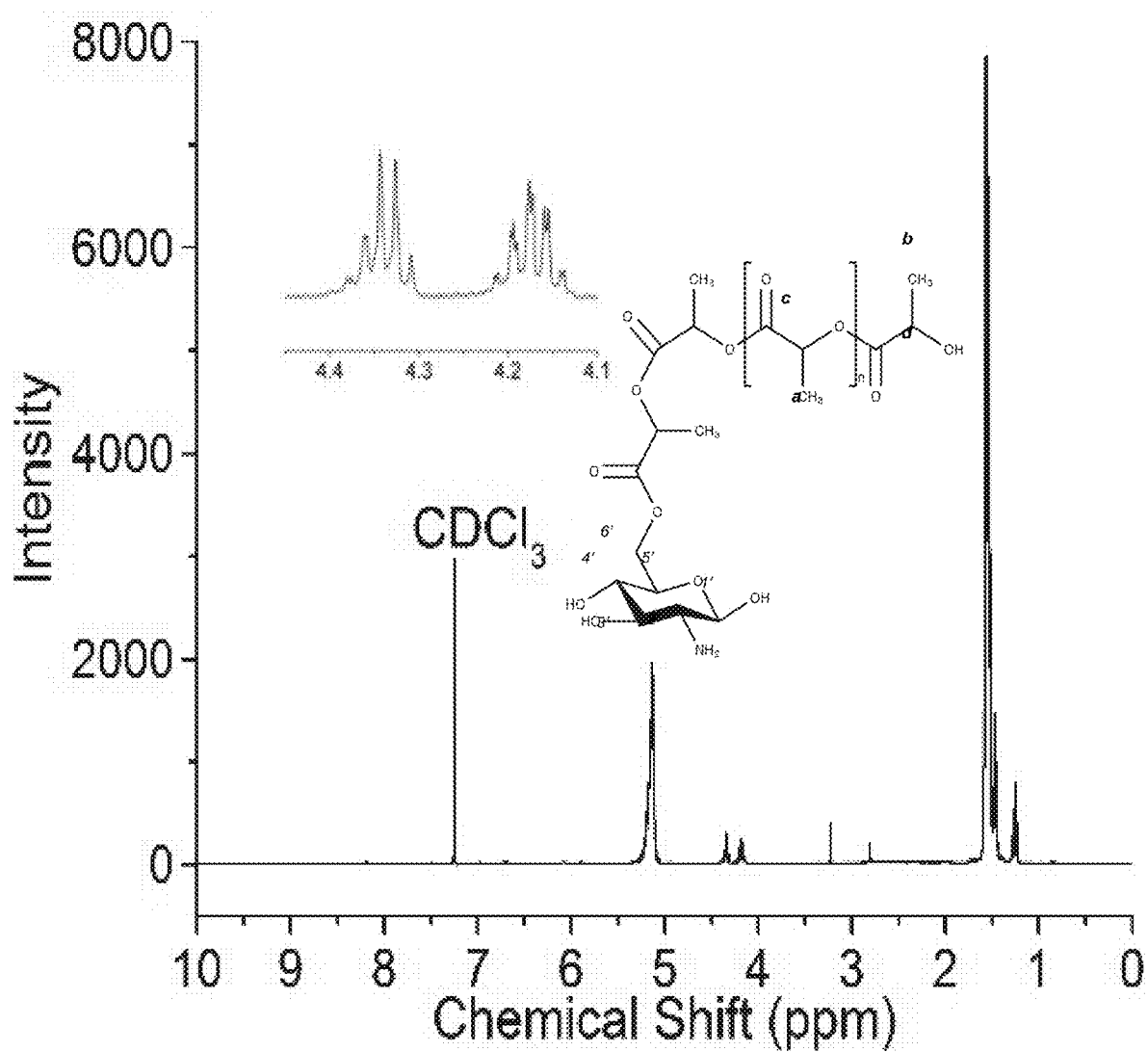
FIG. 6B is a $^1$H-NMR of neat PLA initiated by D-glucosamine (CDCl$_3$; 400 MHz) with inset showing multiplets between 4.4-4.1 ppm.

FIGS. 6A-6B show the $^1$H-NMR spectrum of (FIG. 6A) CHI-g-PLA and (FIG. 6B) neat PLA. The observations common to both molecules include the following: (1) multiplets at 1.6-1.42 & 5.25-5.09 ppm, (2) doublet at 1.4 ppm, (3) a quartet at 4.275 ppm, (4) a singlet at 3.46 ppm, (5) a peak at 3.20 ppm and 2.73 ppm, and (6) a multiplet at 4.4-4.2 ppm. The signals between 3.78-3.7 ppm and at 1.838 ppm were seen in CHI-g-PLA but not PLA.

The $^1$H-NMR spectrum of CHI-g-PLA revealed the presence of both CHI and PLA. The multiplet at 1.6-1.42 ppm represents the methyl protons (a) (FIG. 6A) in the PLA chain. The doublet at 1.4 ppm is associated with the methyl protons in the terminal lactate units of PLA (b). The methine protons of PLA are observed as two separate signals. The multiplet at 5.25-5.09 ppm is typically associated with the methine protons in the PLA chain (c). The quartet at 4.275 ppm is the signal from the methine group in the terminal lactate units of PLA (d). The terminal hydroxyl of PLA is seen at 3.46 ppm. The anomeric protons (H1 and H1') of GlcN and AcGlcN units of CHI are seen at 5.00-4.88 ppm. The signal from these protons is overlapped by that of methine protons of PLA in this region. The peak at 3.20 ppm represents the methine protons (H2') of GlcN of CHI and the peak at 2.73 ppm represents the methine protons (H2) of AcGlcN of CHI as seen in FIG. 6A, inset B. The signal at 1.838 ppm indicates the methyl protons (H7) of the acetamido moiety of AcGlcN of CHI as seen in FIG. 6A, inset C. Typically, a broad overlapping signal between 4.2-3.5 ppm is associated with the protons of the pyranose ring (H3-H6). The signals between 3.78-3.7 ppm can be related to these protons. Without intending to be limited to any particular theory, it is possible that the hydroxyl groups of CHI at C3 and C6 are involved in the ROP of lactide and the subsequent attachment of PLA to CHI. The ring opening could be initiated by a nucleophilic attack of the —OH on the carbonyl carbon of lactide ring. Polymerization proceeds due to the acyl bond cleavage of lactide. The initiation and grafting from CHI lead to the esterification of the alcohol moiety. This reaction changes the substituent on the methine (C3) and/or methylene (C6) carbons of CHI units from —OH to —O—C(=O)—. This causes a downfield shift of the signals of H3 and H6 seen as the multiplet at 4.34 ppm in FIG. 6A. Model homopolymer PLA shows similar signals to CHI-g-PLA as seen in FIG. 6B.

Example 2: Synthesis of HMBs

CHI-g-PLA-g-PNVP (HMB1) was isolated as an odorless white solid, soluble in anisole at 60° C. as seen from FIG.

4B. CHI-g-PLA-g-PAAm (HMB2) was isolated as an odorless pale yellow flaky solid as seen from FIG. 4C and was insoluble in the most common solvents. Homopolymer yields and grafting yields for CHI-g-PLA, CHI-g-PLA-g-PNVP, and CHI-g-PLA-g-PAAm were calculated as shown in Equations (3) and (4):

$$\% \text{ PLA or PNVP or PAAm yield} = \frac{\text{PLA or PNVP retained in the graft copolymer (g)}}{\text{Amount of lactide or NVP in polymerization mixture (g)}} \times 100 \quad (3)$$

$$\% \text{ Grafting yield} = \frac{\text{PLA or PNVP or PAAm retained in the graft copolymer (g)}}{\text{Amount of CHI in polymerization mixture (g)}} \times 100 \quad (4)$$

PLA was obtained at a 20.5% yield with a grafting yield of 740% for CHI-g-PLA. For CHI-g-PLA-g-PNVP, PNVP yield was 42.4% and grafting yield was 212%. PAAm was obtained at a 90% yield with a grafting yield of 90% for CHI-g-PLA-g-PAAm.

In anisole, the nitrogen of the pyrrolidone ring in the PNVP is uncharged. The addition of HCl ionizes the pyrrolidone ring to give a net positive charge, thereby inducing the precipitation of HMB1. The grafting of both PLA and PNVP on the CHI backbone makes HMB1 insoluble in water. It was dispersed in water by mild sonication and flocculated with acetone multiple times to remove unreacted NVP and ungrafted PNVP.

HMB2 was purified by dispersion in water by intermittent sonication and flocculation in methanol multiple times to remove unreacted AAm and ungrafted PAAm. Since two polymers, PAAm and PLA, of such opposing solubilities were grafted to the same CHI backbone, HMB2 was practically insoluble in most solvents.

Example 3: FTIR Spectroscopy

Figure 7A:
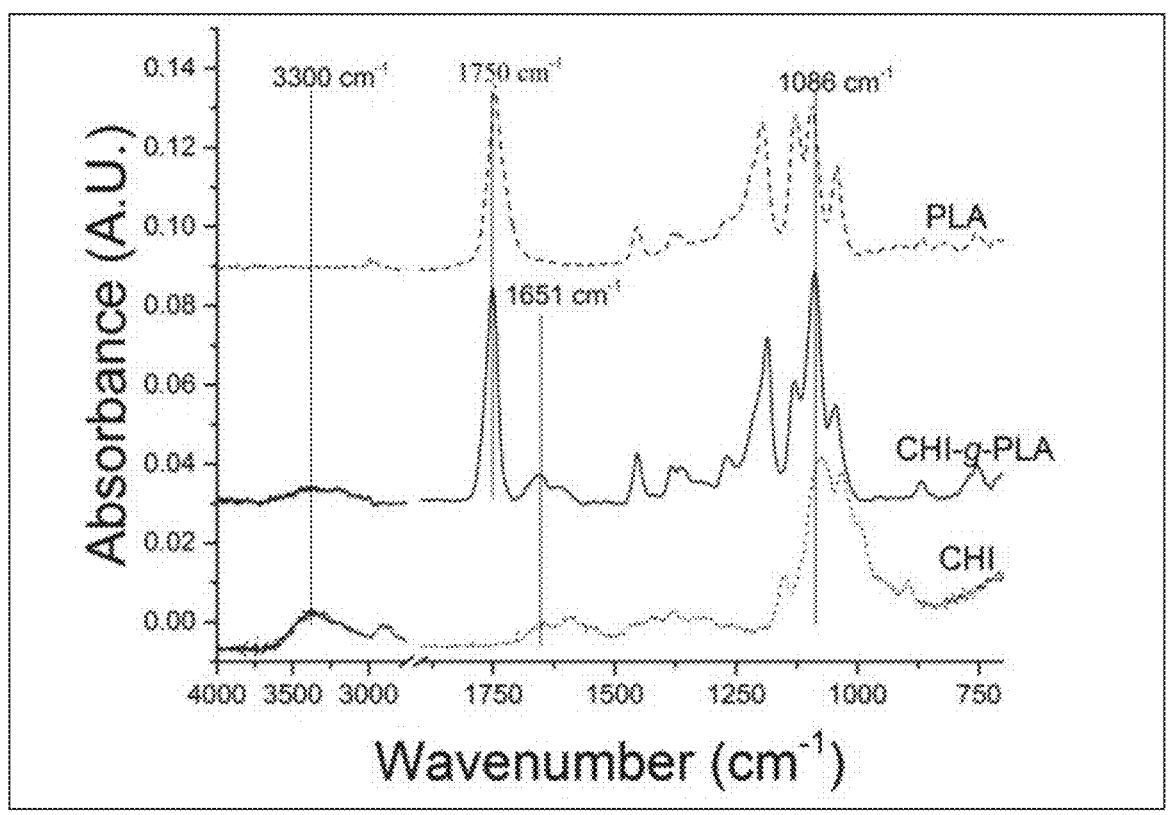
FIGS. 7A-7C are FTIR spectra of: CHI-g-PLA and the two parent polymers, neat CHI and neat PLA (FIG. 7A); HMB1 and its constituent polymers, CHI-g-PLA and PNVP (FIG. 7B); and HMB2 and its constituent polymers, CHI-g-PLA and PAAm (FIG. 7C).
Figure 7B:
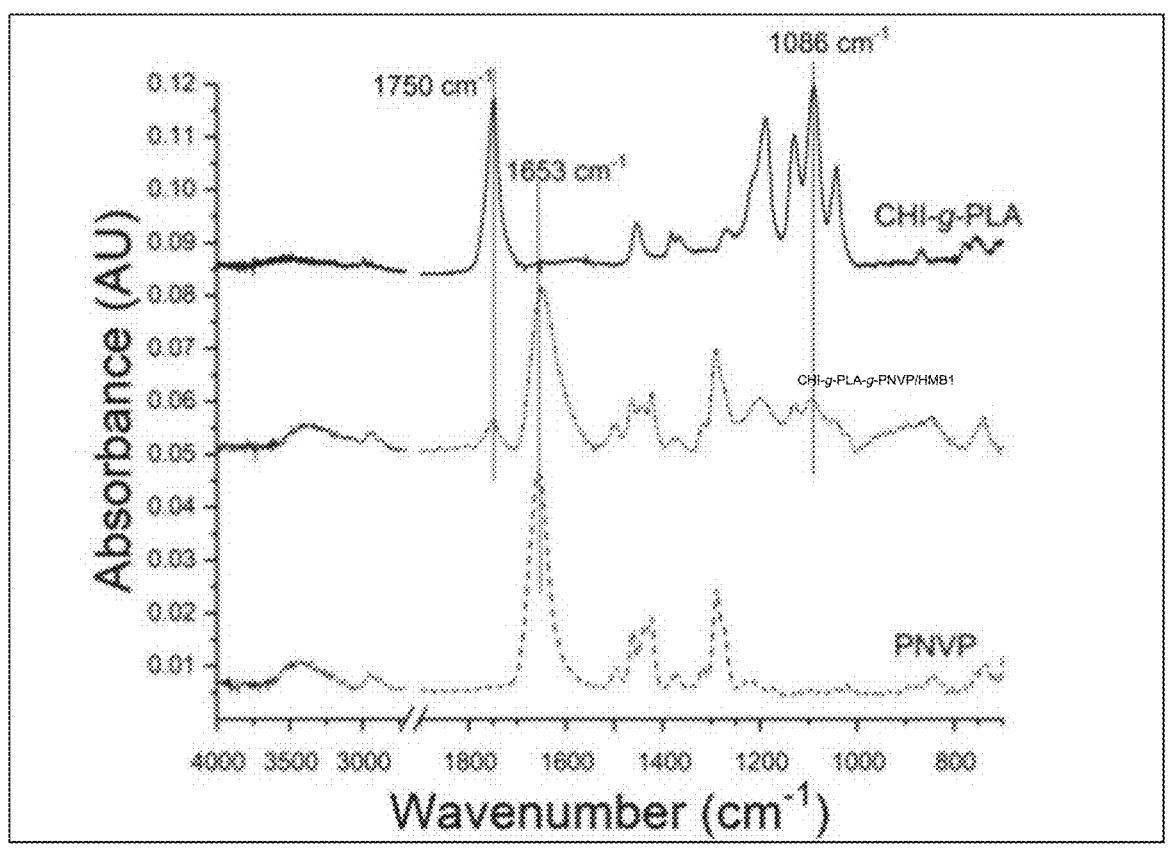
Figure 7C:
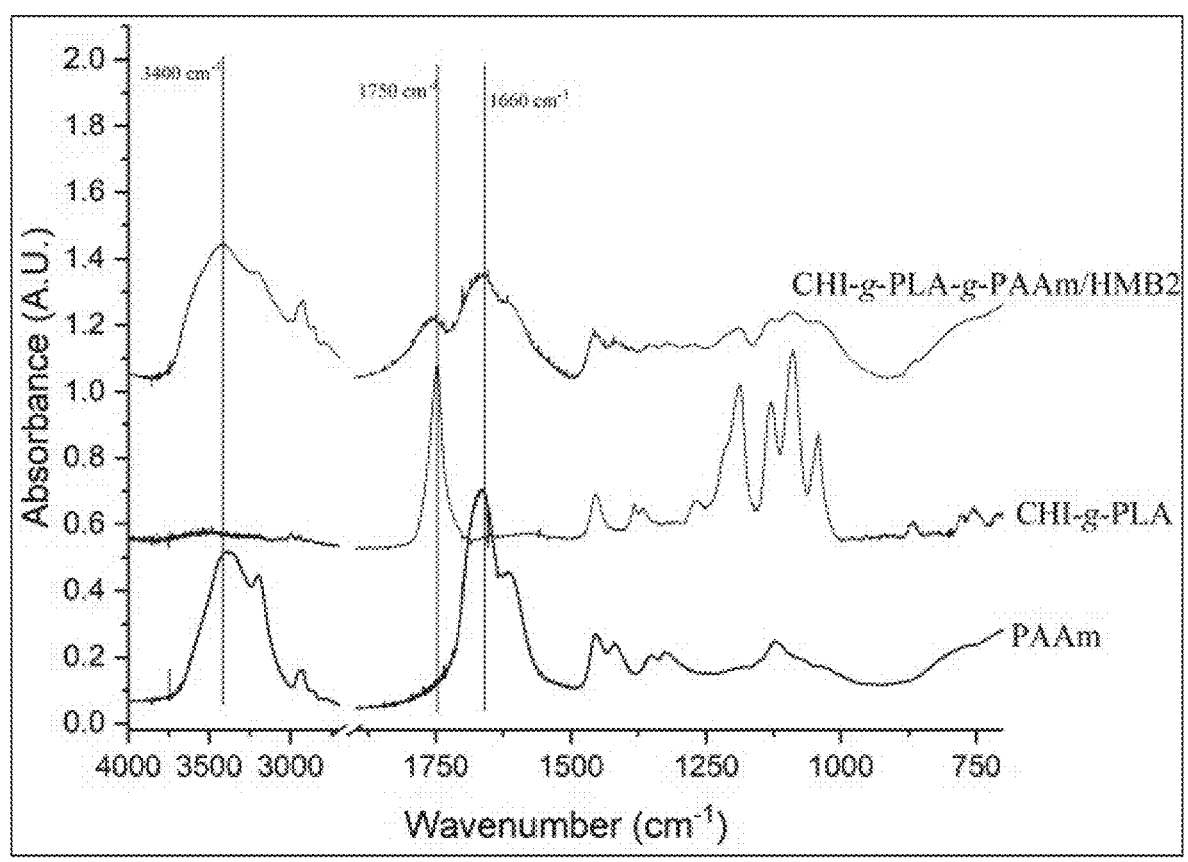

FIGS. 7A-7C show the FTIR spectra of CHI-g-PLA, HMB1, and HMB2 and their constituent parent polymers.

The FTIR spectra for CHI, neat PLA, and CHI-g-PLA are shown in FIG. 7A. Broad peaks at 3600-3000 $cm^{-1}$ and 1654 $cm^{-1}$ were observed for CHI and CHI-g-PLA. A sharp peak at 1750 $cm^{-1}$ was seen in CHI-g-PLA as well as PLA. The peaks ranging from 1250-1050 $cm^{-1}$ were seen both in the CHI-g-PLA, CHI, and PLA.

The FTIR spectra of CHI-g-PLA-g-PNVP, CHI-g-PLA, and neat PNVP are shown in FIG. 7B. Several peaks that were observed in CHI-g-PLA were also observed in CHI-g-PLA-g-PNVP, indicating successful grafting. This includes the peak at 1750 $cm^{-1}$, 1653 $cm^{-1}$, and the three peaks in the range of 1250-1050 $cm^{-1}$. The intensity of the peak at 1653 $cm^{-1}$ increased in CHI-g-PLA-g-PNVP as compared to PNVP. The peak seen at 3700-3100 $cm^{-1}$ was common to PNVP and CHI-g-PLA-g-PNVP.

The FTIR spectra of CHI-g-PLA-g-PAAm, CHI-g-PLA, and neat PAAm are shown in FIG. 7C. A broad peak is seen between 3600-3000 $cm^{-1}$ in CHI-g-PLA-g-PAAm, CHI-g-PLA, and PAAm. There was an increase in the intensity of this peak in CHI-g-PLA-g-PAAm as compared to CHI-g-PLA. A peak at 1750 $cm^{-1}$ was seen in CHI-g-PLA-g-PAAm and CHI-g-PLA, and a peak at 1663 $cm^{-1}$ was seen in CHI-g-PLA-g-PAAm, CHI-g-PLA and PAAm. The peak at 1663 $cm^{-1}$ had increased intensity in CHI-g-PLA-g-PAAm as compared to CHI-g-PLA. Peaks ranging from 1250-1050 $cm^{-1}$ were seen in the CHI-g-PLA-g-PAAm, CHI, PLA, and PAAm.

For CHI-g-PLA and its parent polymers, the broad absorption band from 3600-3000 $cm^{-1}$ reflects the stretching mode of the free hydroxyl and amine groups as well as inter- and intra-molecular hydrogen bonds of CHI. This broad peak has a lower intensity in CHI-g-PLA than in CHI. This is potentially due to the decrease in the hydrogen bonding as a result of the PLA grafting. The peak at 1753 $cm^{-1}$ in PLA that corresponds to the —C=O (ester) stretching shifts to 1750 $cm^{-1}$ in CHI-g-PLA due to grafting onto the backbone. The amide stretching peak at 1654 $cm^{-1}$ from the acetamido groups of CHI were also clearly seen on the CHI-g-PLA spectrum. The peaks ranging from 1250-1050 $cm^{-1}$ were assigned to CO stretching of carboxyl groups and C—O—C stretching vibrations both in the graft and parent polymers; however, the intensity of these peaks varied, suggesting alteration of parent polymers CHI and PLA.

For HMB1 (CHI-g-PLA-g-PNVP), the peak seen at 3700-3100 $cm^{-1}$ in PNVP represents the NH stretching. The intensity of this band at 3600-3000 $cm^{-1}$ in CHI-g-PLA increased in HMB1 due to the N—H and O—H stretching vibrations of water coordinated with PNVP as well as intramolecular hydrogen bonding. The peak at 1750 $cm^{-1}$ of PLA in CHI-g-PLA corresponding to the —C=O (ester) stretching is still present in the HMB1 with a lowered intensity. The peak at 1653 $cm^{-1}$ in PNVP and HMB1 represented the —C=O (amide) stretching. The presence of both the ester and amide stretching peaks in the HMB confirmed that both PLA and PNVP had been grafted to the CHI backbone. The peak at 1423 $cm^{-1}$ of HMB1 represents the —C—N vibrations of PNVP and at 1290 $cm^{-1}$ represents the —CH bending in PVP. The three peaks in the range of 1250-1050 $cm^{-1}$ seen in the HMB1 are characteristic of CHI-g-PLA.

It is evident from the FTIR spectra of CHI-g-PLA and HMB1 that the fraction of PLA is larger than CHI in CHI-g-PLA and that the fraction of PNVP is bigger in the HMB1 compared to the PLA. It is difficult to distinguish between CHI-g-PLA and its parent polymers in the FTIR spectrum largely because CHI and PLA have similar functional groups.

In the FTIR spectra of HMB2 (CHI-g-PLA-g-PAAm), the bands at 3400 $cm^{-1}$ in PAAm were associated with the asymmetric and symmetric stretching vibrations of —$NH_2$. The contour at 2900 $cm^{-1}$ corresponded to the C—H stretching vibrations. The peak at 1663 $cm^{-1}$ in PAAm was assigned to the —C=O (amide). This peak was present in HMB2 along with the —C=O (ester) at 1753 $cm^{-1}$ confirming the presence of both PAAm and PLA in the HMB. The peaks in the range of 1250-1050 $cm^{-1}$ were assigned to the C—O stretching from carbonyl groups and C—O—C stretching of CHI and PLA as well as the pyranoid ring stretching and C—OH stretching of CHI. These peaks are present in both CHI-g-PLA and HMB2.

Example 4: Thermal Analysis

Figure 8A:
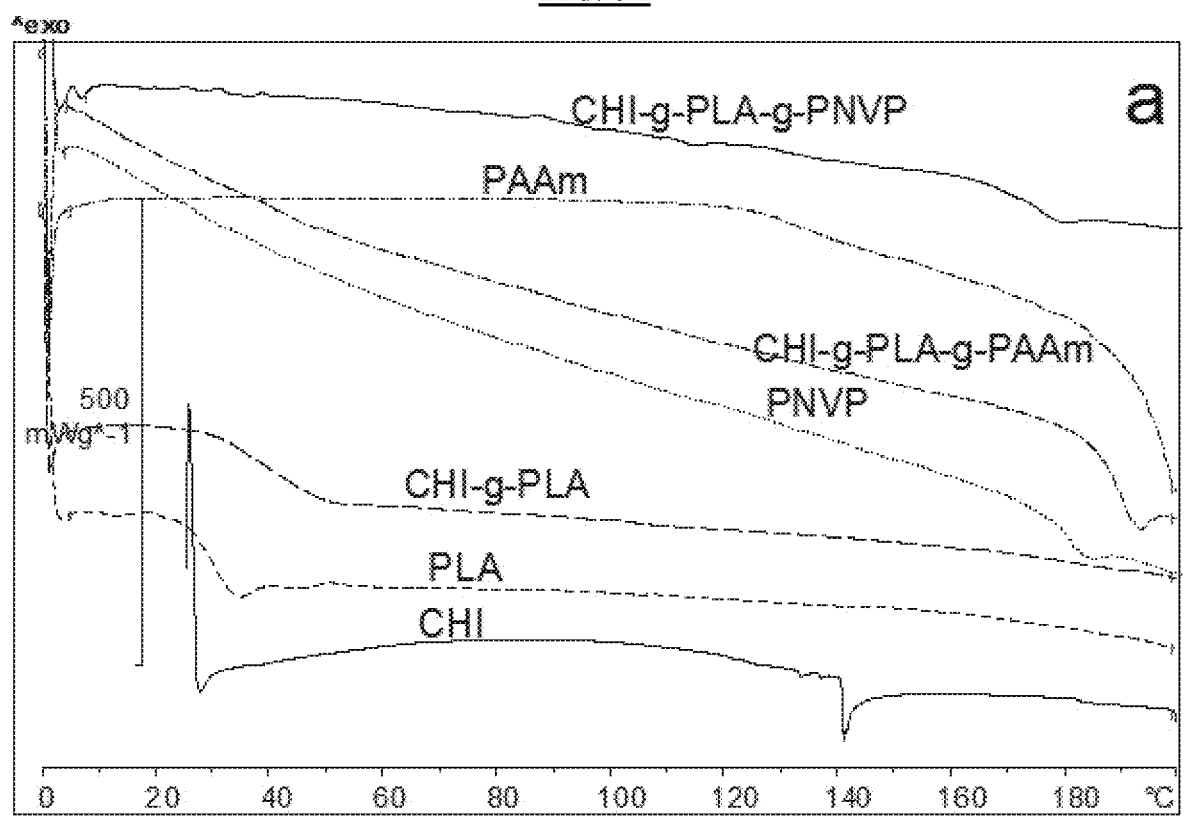
FIGS. 8A-8C are DSC curves of CHI-g-PLA, CHI-g-PLA-g-PNVP, CHI-g-PLA-g-PAAm, and the parent polymers from heating cycles (FIG. 8A); DSC curves of CHI-g-PLA, CHI-g-PLA-g-PNVP, CHI-g-PLA-g-PAAm, and the parent polymers from heating cycles (FIG. 8B), and TGA curves of CHI-g-PLA, CHI-g-PLA-g-PNVP, CHI-g-PLA-g-PAAm, and the parent polymers (FIG. 8C).
Figure 8B:
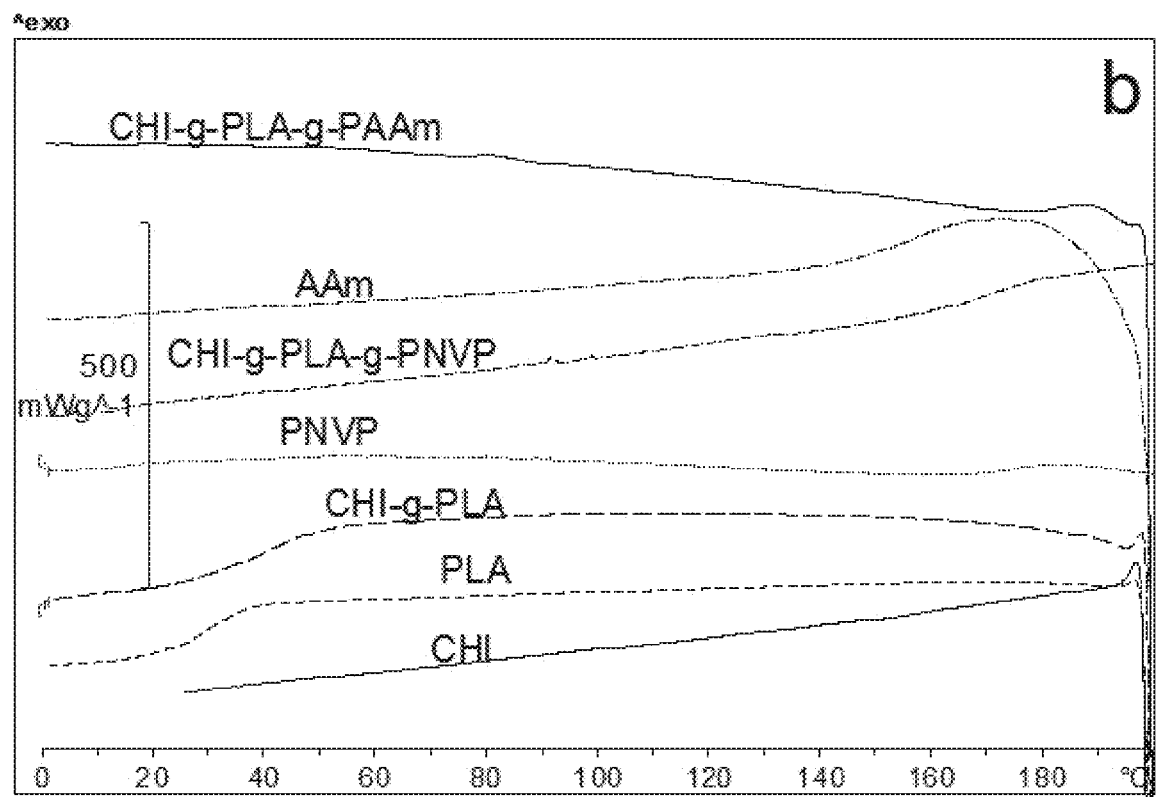
Figure 8C:
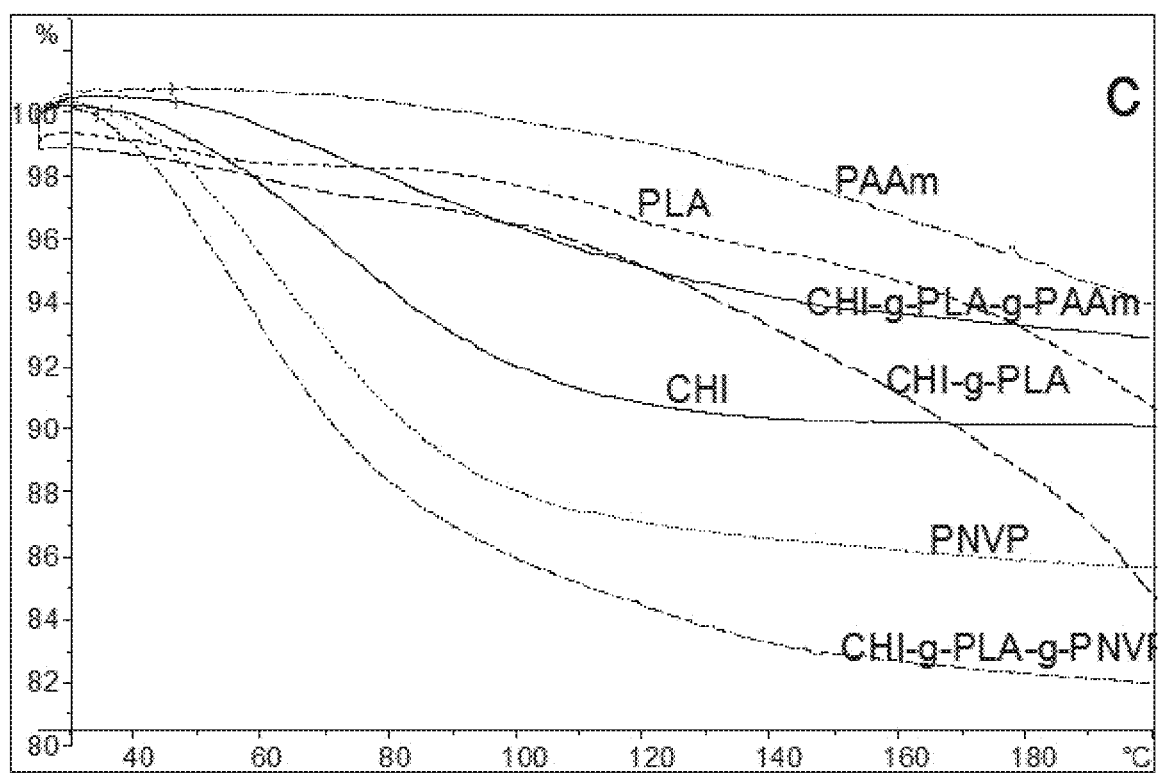

FIGS. 8A-8C show DSC and TGA thermograms of CHI-g-PLA and the HMBs. Both heating and cooling thermograms are shown in FIGS. 8A and 8B, respectively. The thermal transitions observed in the first heating cycle show processing effects such as loss of residual solvent, while these are less significant in the cooling cycle, which may be more representative to the molecular properties. Table 2 summarizes the major thermal transitions observed in these thermograms.

TABLE 2

$T_g$ and $T_{deg}$ of CHI-g-PLA, CHI-g-PLA-g-PNVP, CHI-g-PLA-g-PAAm and their constituent polymers.

| Polymer | $T_g$ from heating cycle (° C.) | $T_g$ from cooling cycle (° C.) | $T_{deg}$ (° C.) |
|---|---|---|---|
| CHI-g-PLA | 38.2 | 40.4 | ~140 |
| CHI-g-PLA-g-PNVP | 171.5 | 166.5 | ~400 |
| CHI-g-PLA-g-PAAm | Not seen | 88.5 | >200 |
| PLA | 26.3 | 27.7 | ~140 |
| PNVP | 177.3 | Not seen | ~400 |
| CHI | 126.0 | Not seen | >200 |
| PAAm | 131.5 | 157.3 | >200 |

Thermal transitions in graft copolymers depend on the miscibility of their parent polymers, molecular weights and the proportions of the backbone and side-chains. Molecular brushes usually do not exhibit phase transitions corresponding to their homopolymers, but show a distinct behavior. The first heating cycle for CHI showed a wide endotherm around 90° C., possibly due to water loss. A minor endothermic step at 126.0° C. in the second and third heating cycles corresponded to the $T_g$ reported in literature. CHI-g-PLA and HMB showed an endotherm in the first heating cycle comparable to what was observed in CHI. The sample of CHI-g-PLA revealed a $T_g$ at 38.2° C. and 40.4° C. in the heating and cooling cycles respectively. The $T_g$ of CHI-g-PLA occurred between that of CHI and PLA, yet largely shifted toward the $T_g$ of PLA, potentially due to a higher fraction of PLA in the material. The grafting of PLA chains ($M_n$ 3400 Da) had a plasticizing effect on semi-crystalline CHI, decreasing its $T_g$ to 38-40° C. Grafting of PNVP on to CHI-g-PLA significantly increased its $T_g$ to 171.5° C. and 166.5° C. in the heating and cooling cycles, respectively. This $T_g$ of HMB1 lies between that of CHI-g-PLA and neat PNVP but is largely shifted toward PNVP, potentially attributable to the larger fraction of PNVP present in the HMB1, as compared to CHI-g-PLA, which is corroborated by the FTIR analysis. Due to the comb-like architecture of the HMB and CHI-g-PLA, the final $T_g$ is affected by CHI, PLA and PNVP influencing each other's behavior.

$T_g$ of HMB2 was 88.5° C. in the cooling cycle. HMB2 did not show a $T_g$ in the heating curve. PAAm showed a $T_g$ of 153-188° C. PAAm showed a $T_g$ of about 131.5° C. in the heating curve and 157.3° C. in the cooling curve. On grafting PAAm to CHI-g-PLA, the $T_g$ increased by 48° C., suggesting that the proportion of PLA and PAAm on the model HMB is similar. This is also shown by the FTIR. HMB2 degrades above 200° C.

Example 5: Evaluation of Polymer Morphology Using AFM

Figure 9A:
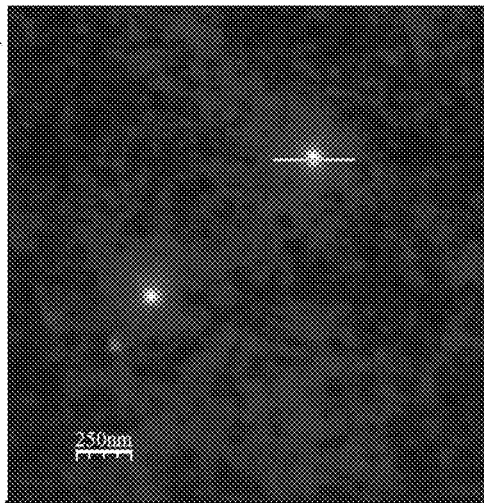
FIGS. 9A-9F are an atomic force microscopy (AFM) image of a single molecule of CHI-g-PLA deposited on mica from 0.1% THF solution showing the core-corona type morphology (FIG. 9A), a height profile of the one molecule of CHI-g-PLA (FIG. 9B), an AFM image of CHI-g-PLA-g-PNVP deposited on mica from a anisole/water emulsion showing the droplet morphology (FIG. 9C), a height profile of the one droplet of CHI-g-PLA-g-PNVP emulsion (FIG. 9D), an AFM image of CHI-g-PLA-g-PAAm deposited on mica from 0.01% dispersion in deionized water showing the beaded leaf-like morphology (FIG. 9E), and a height profile of the CHI-g-PLA-g-PAAm molecule (FIG. 9F).
Figure 9B:
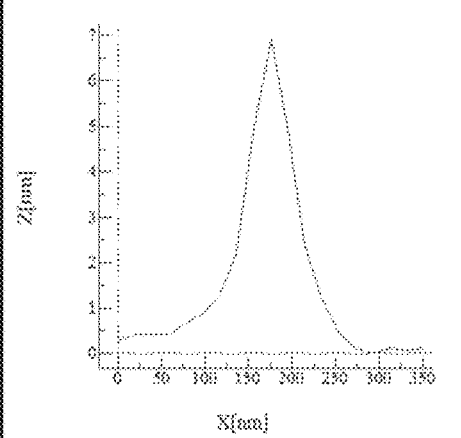
Figure 9C:
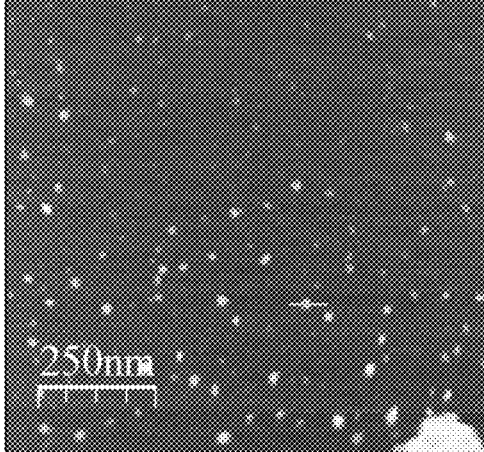
Figure 9D:
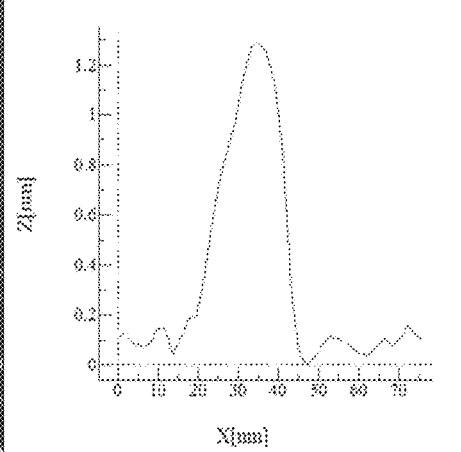
Figure 9E:
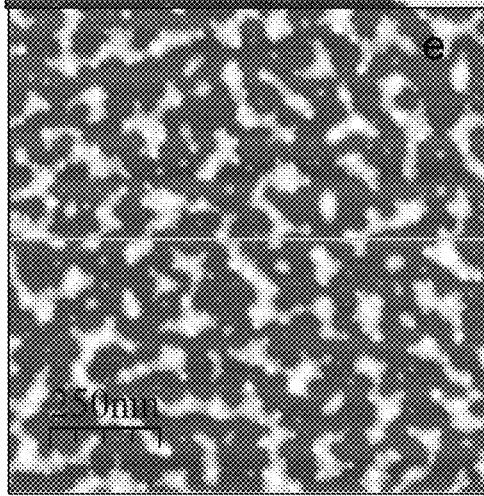
Figure 9F:
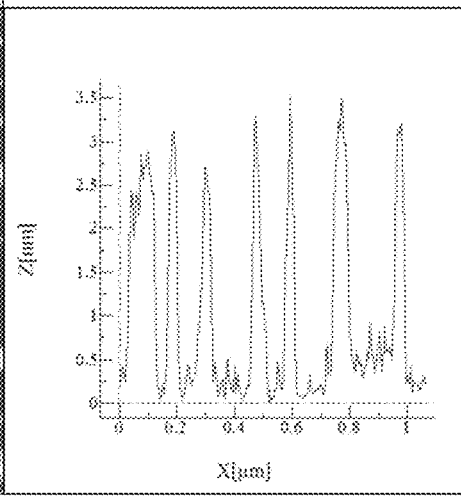

FIG. 9A showed the AFM image of CHI-g-PLA. A distinctive structure with a core and surrounding corona was observed. The line across the molecule highlights it for the height profile. FIG. 9B shows the corresponding height profile. It was observed that the average core height was 3.3 nm and the corona has an average thickness of about 0.4 nm. FIG. 9C shows the morphology of CHI-g-PLA-g-PNVP deposited on mica from an anisole/water emulsion. FIG. 9D shows the height profile of the highlighted droplet. The droplets deposited had an average diameter of 39 nm (±7 nm). The average height of the droplet was 1.1 nm (+0.2 nm). FIG. 9E shows the AFM image of the CHI-g-PLA-g-PAAm deposited on mica from 0.01% dispersion in water. A beaded leaf-like structure of the polymer is observed. FIG. 9F shows the height profile of the highlighted region of CHI-g-PLA-g-PAAm. The leaf-like region has variable length of 100-300 nm. The average height of the beads was about 2.5 nm.

Once deposited on mica, the CHI-g-PLA molecules showed a distinctive shape. The core has a height greater than the surrounding corona. Without intending to limited to any particular theory, because the polymer was deposited from THF, it is hypothesized that the core portion was CHI, whereas the surrounding corona was PLA. This structure is supported by the negative second virial coefficient observed by SLS. If it is assumed that the spherical shape of the core has the diameter of 3.3 nm, and density of 1 g·cm$^{-3}$, the molecular weight of the CHI core is calculated to be 11,000 Da. This is in agreement with the molecular weight obtained from UV-Vis studies tracking the degradation of CHI.

For CHI-g-PLA-g-PAAm, due to the presence of PAAm and PLA, one hydrophilic and another hydrophobic, both tethered to CHI backbone, the HMB was neither soluble in water nor in any organic solvent. The material could, however, be dispersed in water. Without intending to limited to any particular theory, it would be expected that the hydrophobic PLA formed the core of the molecule when dispersed in water while PAAm occupied the surroundings. In the AFM image, a molecule that had opened up with a beaded leaf-like structure was observed. Considering the height of PLA beads (2.5 nm) to be the diameter of PLA, its molecular weight was calculated to be about 4900 Da, which is in reasonable agreement with the value obtained from GPC.

Example 6: Switching of HMB "Grafting on" PGMA-Modified Silicon Wafers

Figure 10A:
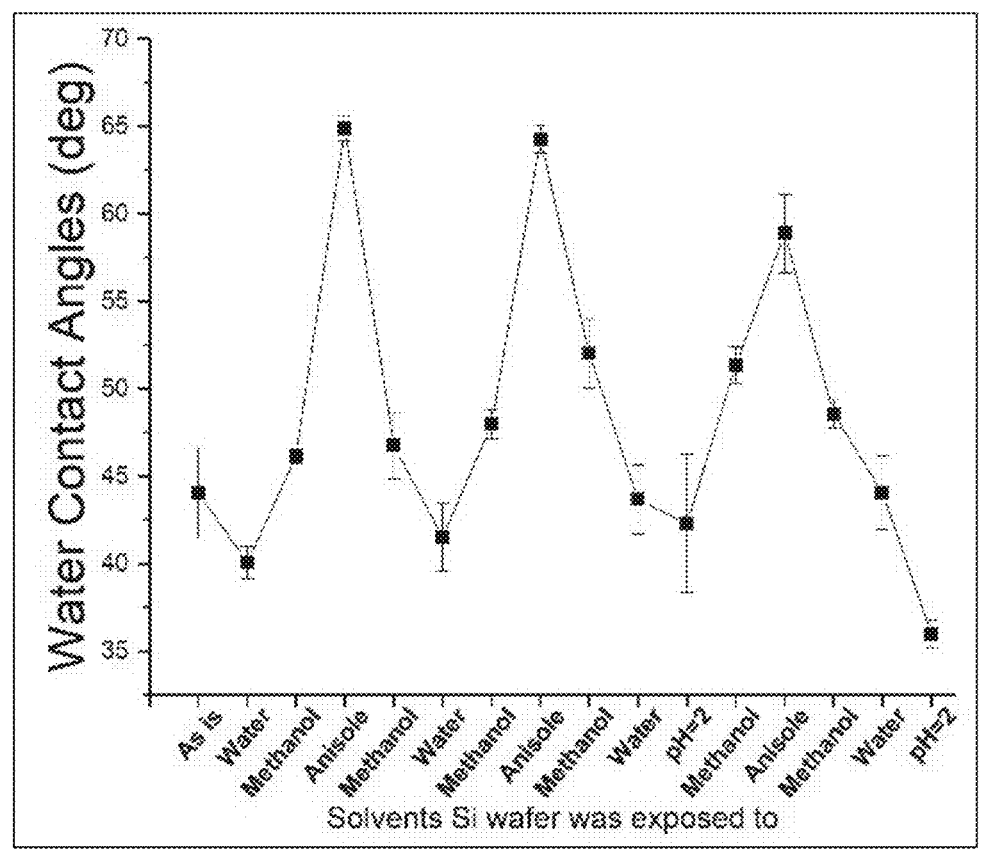
FIGS. 10A-10B are graphs showing evolution of water contact angles of CHI-g-PLA-g-PNVP grafted on the Si wafer after exposure to water (neutral), water (pH 2), methanol, and anisole (FIG. 10A) and evolution of water contact angles of CHI-g-PLA-g-PAAm grafted on the Si wafer after exposure to water, methanol, and anisole (FIG. 10B).
Figure 10B:
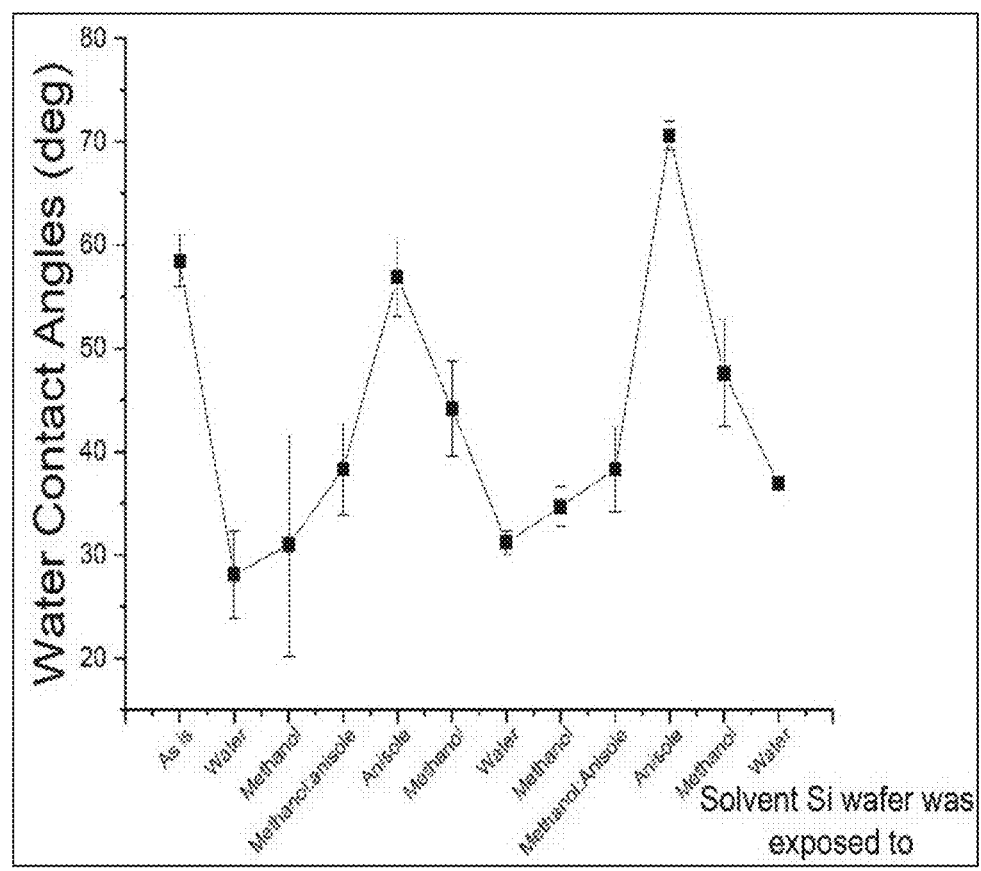

FIG. 10A shows the changes in the water contact angles (CAs) of CHI-g-PLA-g-PNVP films grafted on to Si wafer after exposure to water at pH 2, methanol, and anisole. FIG. 10B shows the changes in the water CAs of CHI-g-PLA-g-PAAm films grafted on to Si wafer after pre-exposure to water, methanol, methanol:anisole (1:1), and anisole.

As seen from FIG. 10A, the surface of the CHI-g-PLA-g-PNVP film had a pre-treatment water CA of around 44° prior to solvent exposure. Upon exposure to water (pH 2), the water CA lowered slightly to 400. Subsequent exposures to methanol and anisole increased CA to 470 and 65° respectively. FIG. 10A shows the reproducibility and reversibility of this switching. FIG. 10B shows a similar switching profile for the CHI-g-PLA-g-PAAm film, with a water CA of around 60° prior to solvent exposure.

Figure 11A:
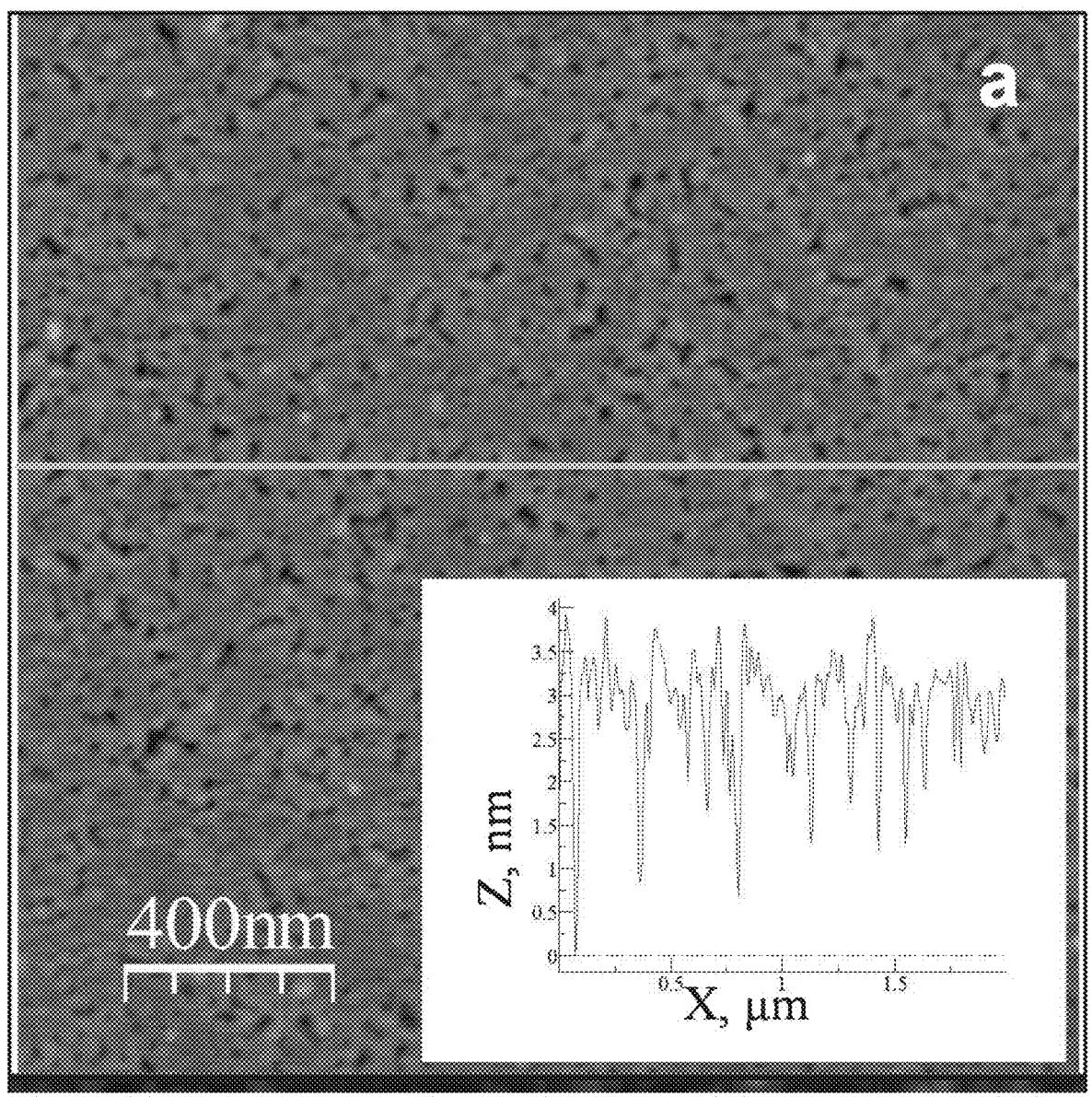
FIGS. 11A-11D are AFM images of HMB-tethered to PGMA on Si wafer following solvent exposure.
Figure 11B:
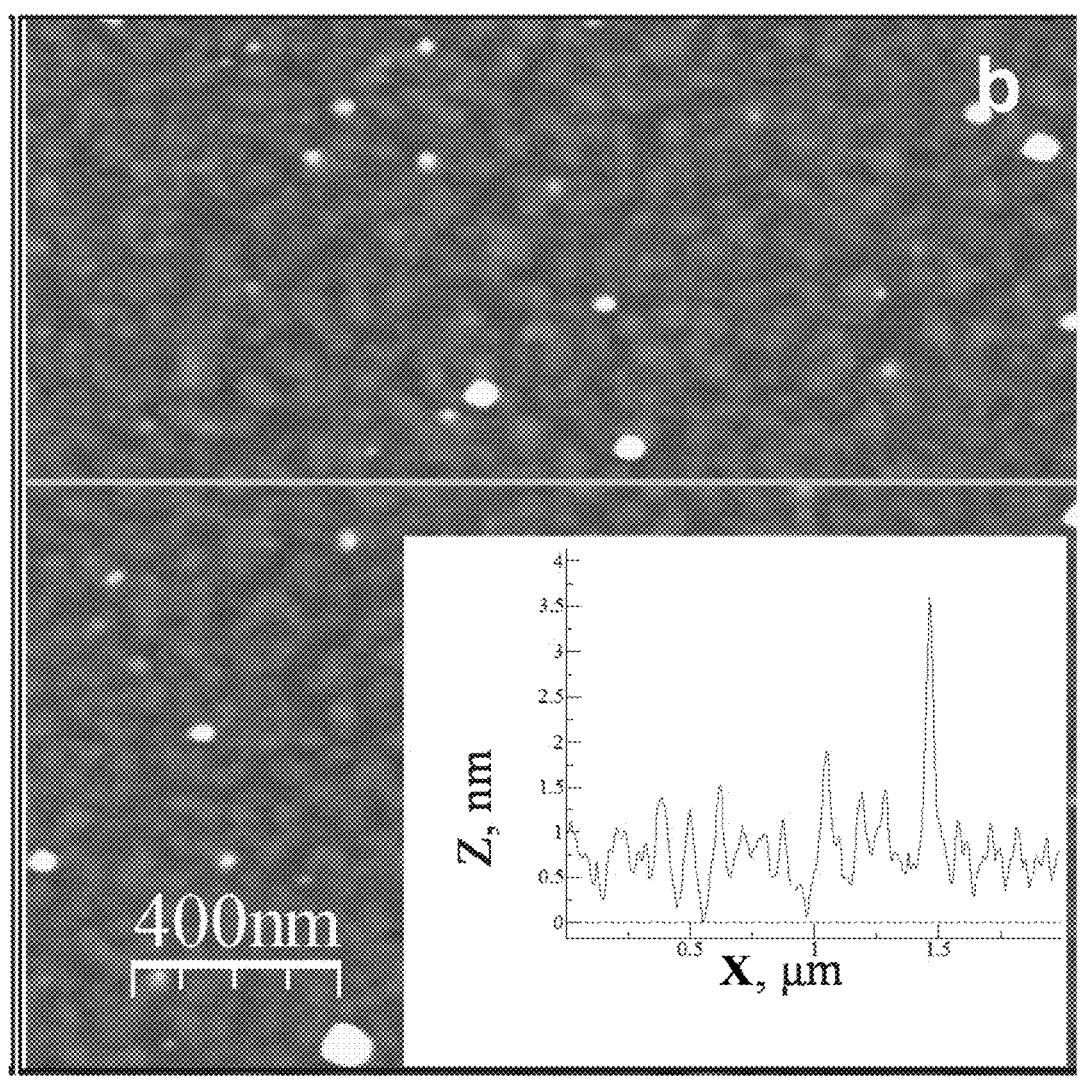
Figure 11C:
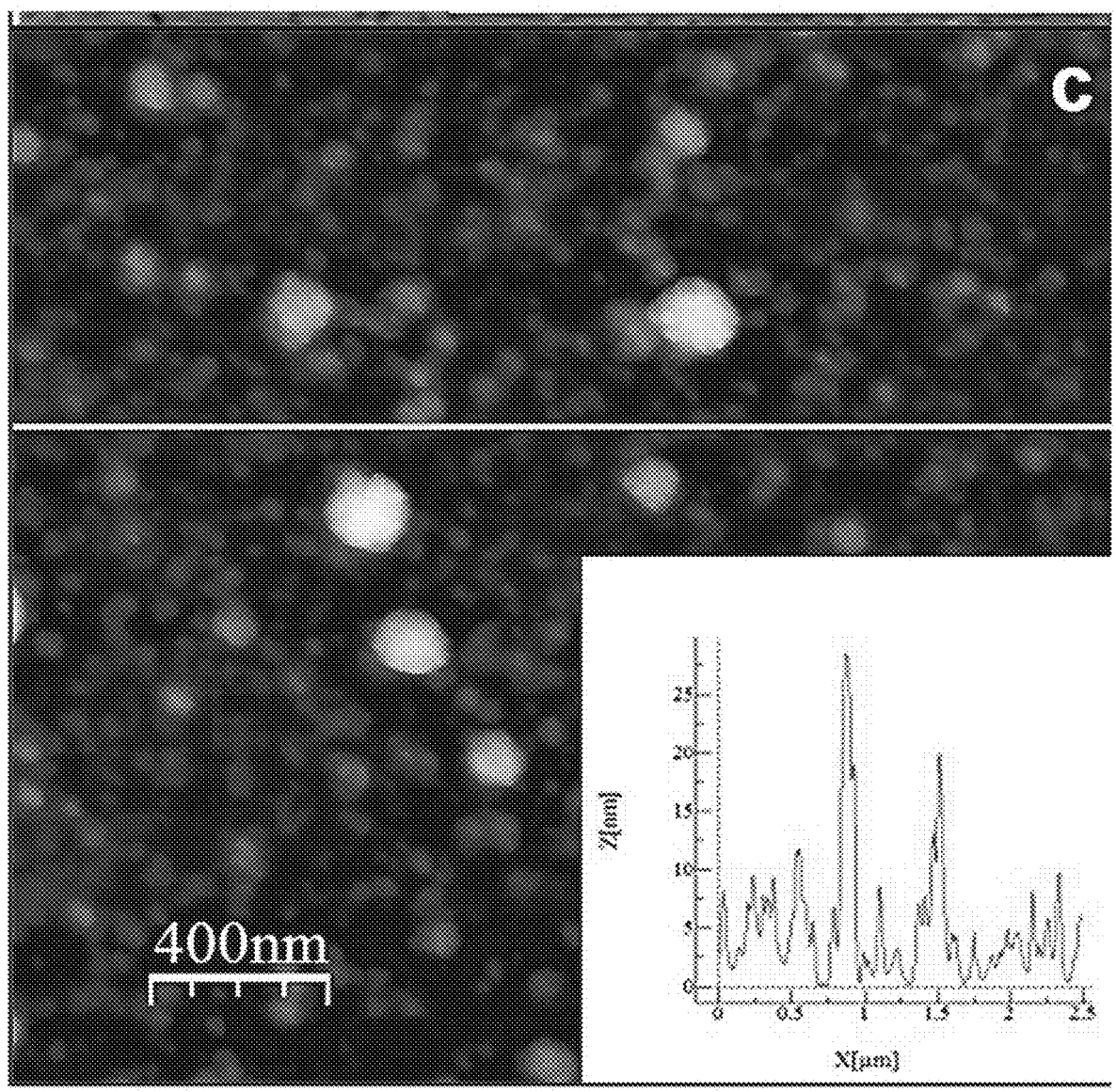
Figure 11D:
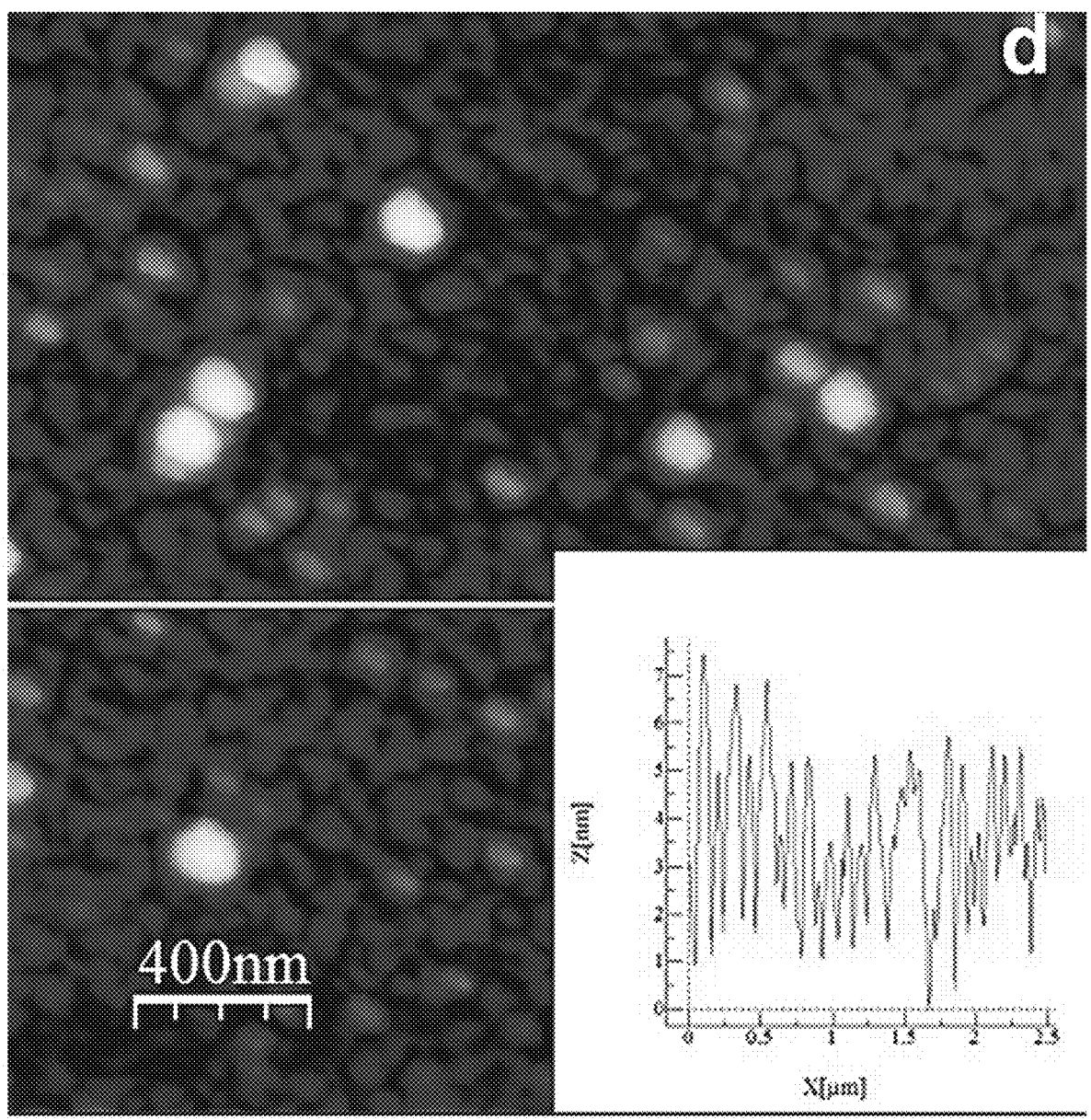

FIGS. 11A-11B show the AFM images of the CHI-g-PLA-g-PNVP films and corresponding height profiles as insets. The height profiles were confirmed by ellipsometry to be about 5 nm thick. The figures show that CHI-g-PLA-g-PNVP films have a rug-like morphology. FIG. 11A shows a r.m.s (root mean squared) roughness of 0.65 nm while FIG. 11B shows an r.m.s roughness of 0.35 nm. The results show that the surface exposed to the hydrophobic solvent was substantially smoother than that exposed to water. FIGS. 11C-11D show similar images for CHI-g-PLA-g-PAAm. Ellipsometry measurements showed the average thickness to be about 8 nm. The AFM images show that the CHI-g-PLA-g-PAAm grafted to the surface shows a rug-like morphology like CHI-g-PLA-g-PNVP. Upon water exposure, the r.m.s roughness was 11.6 nm, while hydrophobic solvent exposure resulted in an r.m.s roughness of 5.7 nm. These results were very similar to those observed for CHI-g-PLA-g-PNVP films. All r.m.s. roughness measurements were made at 1×1 µm², AFM digital resolution 512×512.

The multifunctional nature of CHI backbone makes it particularly convenient to attach to a solid substrate using covalent bonds. Surface characteristics of the anchored HMB can be modified by switching between the different side-chains exploiting their solubility. HMB1, having a thickness of about 3-5 nm was "grafted to" the PGMA-modified silicon wafer. This grafting was achieved through covalent bonding of the glycidyl groups of PGMA and the amino groups of CHI. The HMB1 grafted on the silicon surface resembled a "rug-like" morphology. The HMB1 film with PLA on top resembled a rug-like morphology whereas the PNVP functionalized HMB film was rougher with more creases. The change in surface characteristics was studied by measuring the contact angle (CA) upon exposure of the surface-grafted HMB to water, methanol and anisole for 30-60 minutes. The surface transformed from fairly hydrophilic on exposure to water, to rather hydrophobic on exposure to anisole. The intermediate exposure to methanol ensured gradual switching of the surface. As the components of the polymer brush were strongly immiscible, it could not be switched by direct exposure to a common solvent. Therefore, gradual switching was used. The polymer brush had a CA of around 40° on exposure to water, which suggests that the PNVP (hydrophilic component of HMB1) occupied the surface. It is not possible to obtain the water CA of PNVP alone due to its solubility in water but blending PNVP with hydrophobic polymers lowers its CA to 30-400 (Zhang & Lam, 2005, *J. Colloid and Interface Sci.* 285(1): 80-85). This previously reported CA is greater than that of PNVP brush tethered to the surface, which was found to be 17°. However, in pH 2, the CA lowered further to 33°. This could be due to the protonation of the nitrogen in the pyrrolidone ring. The CA increased to around 47° on exposure to methanol. Exposure to methanol decreased the amount PNVP on the surface. Finally, as the surface was gradually exposed to anisole, the CA increased to 650 suggesting that the surface was predominantly occupied by PLA. The CA of the HMB1 surface switched to PLA never reached the CA of neat PLA (78°) because of PNVP's solubility in anisole. The process of switching was done twice to ensure switchability in both directions.

For HMB2, the change in surface characteristics was studied by measuring CA upon exposure of the surface-grafted HMB2 to water, methanol, methanol:anisole (1:1 mixture) and anisole for 30-60 minutes each. Like HMB, the surface switched from hydrophilic on exposure to water, to hydrophobic on exposure to anisole. Methanol and methanol:anisole were used in order to ensure gradual switching. The polymer brush had a CA of 28.1±4.2° on exposure to water, which suggested that the PAAm (hydrophilic component of HMB2) occupied the surface. The CA increased to 30.1±8.90 and 37.8±3.7° on exposure to methanol and methanol:anisole respectively. Exposure to methanol decreased the amount of PAAm on the surface. As the surface was gradually exposed to anisole, the CA increased to 58.5±4.4° suggesting that the surface was predominantly occupied by PLA. This process was done twice to ensure switchability in both directions. During the second switching, CAs of 31.1±1.06° with water and 70.6±1.3° with anisole, similar to the CA of neat PLA (78.3±0.6°), were observed.

The results confirmed that amphiphilic polymer brushes were successfully grafted on to a surface and that the polymer brushes demonstrated adaptability depending on the nature of the solvent they were exposed to. A significant difference was seen on switching from water to anisole for both HMB1 and HMB2.

Enumerated Embodiments

The following exemplary embodiments are provided, the numbering of which is not to be construed as designating levels of importance.

Embodiment 1 provides a hybrid molecular brush (HMB) comprising: a backbone polymer comprising chitosan; at least one hydrophilic side-chain polymer comprising at least one polymer selected from the group consisting of polyvinylpyrrolidone, poly acrylamide (PAAm), and polyethylene glycol; and at least one hydrophobic side-chain polymer comprising at least one polymer selected from the group consisting of polylactide (polylactic acid, PLA), polycaprolactone, polybutyrolactone, polyvalerolactone, polyglycolide (polyglycolic acid) and any random and block copolymers thereof; wherein the at least one hydrophilic side-chain polymer and the at least one hydrophobic side-chain polymer are covalently bound to the backbone polymer.

Embodiment 2 provides the HMB of Embodiment 1, wherein the backbone polymer comprises chitosan, wherein the hydrophobic side-chain polymer comprises polylactide, and wherein the hydrophilic side-chain polymer comprises polyvinylpyrrolidone.

Embodiment 3 provides the HMB of Embodiments 1-2, wherein the HMB comprises about 1 to about 10,000 hydrophobic side-chain polymers per backbone polymer.

Embodiment 4 provides the HMB of Embodiments 1-3, wherein the HMB comprises about 9 to about 10 hydrophobic side-chain polymers per backbone polymer.

Embodiment 5 provides the HMB of Embodiments 1-4, wherein the HMB comprises about 1 to about 10,000 hydrophilic side-chain polymers per backbone polymer.

Embodiment 6 provides the HMB of Embodiments 1-5, wherein the HMB comprises about 5 to about 100 hydrophilic side-chain polymers per backbone polymer.

Embodiment 7 provides the HMB of Embodiments 1-6, wherein the HMB comprises a chitosan backbone polymer having a number average molecular weight of about 1 kDa to about 1,000 kDa.

Embodiment 8 provides the HMB of Embodiments 1-7, wherein the HMB comprises a chitosan backbone polymer having a number average molecular weight of about 11 kDa.

Embodiment 9 provides the HMB of Embodiments 1-8, wherein the HMB comprises polylactide side-chain polymers having a number average molecular weight of about 1 kDa to about 100 kDa.

Embodiment 10 provides the HMB of Embodiments 1-9, wherein the HMB comprises polylactide side-chain polymers having a number average molecular weight of about 3.4 kDa.

Embodiment 11 provides the HMB of Embodiments 1-10, wherein the HMB comprises hydrophilic side-chain polymers having a number average molecular weight of about 1 kDa to about 1,000 kDa.

Embodiment 12 provides the HMB of Embodiments 1-11, wherein the HMB comprises hydrophilic side-chain polymers having a number average molecular weight of about 1 kDa to about 100 kDa.

Embodiment 13 provides the HMB of Embodiments 1-12, wherein the HMB has a number average molecular weight of about 3 kDa to about 2,000 kDa.

Embodiment 14 provides the HMB of Embodiments 1-13, wherein the HMB has a number average molecular weight of about 12 kDa to about 120 kDa.

Embodiment 15 provides the HMB of Embodiments 1-14, wherein the chitosan backbone has a polydispersity index of about 1.1 to about 5.

Embodiment 16 provides the HMB of Embodiments 1-15, wherein the HMB comprises polylactide side-chains having a polydispersity index of about 1.01 to about 2.

Embodiment 17 provides the HMB of Embodiments 1-16, wherein the HMB comprises hydrophilic side-chains having a polydispersity index of about 1.5 to about 3.

Embodiment 18 provides the HMB of Embodiments 1-17, wherein the HMB is grafted onto a surface.

Embodiment 19 provides the HMB of Embodiments 1-18, wherein the HMB is grafted onto the surface via a covalent bond between the backbone polymer and a surface species.

Embodiment 20 provides the HMB of Embodiments 1-19, wherein the surface species is a polymer deposited onto a surface.

Embodiment 21 provides the HMB of Embodiments 1-20, wherein the surface comprises silicon.

Embodiment 22 provides a method of making a hybrid molecular brush, the method comprising grafting a hydrophobic polymer to a backbone polymer in a biphasic non-emulsion system.

Embodiment 23 provides the method of Embodiment 22, a biphasic non-emulsion system is prepared by mixing a first solution of a backbone polymer in a first solvent with a second solution of a side-chain polymer precursor in a second solvent, wherein the first solution and the second solution are immiscible upon first contact and do not form an emulsion.

Embodiment 24 provides the method of Embodiments 22-23, wherein the first solvent is polar, the second solvent is non-polar, and the side-chain polymer precursor is a hydrophobic side-chain polymer precursor.

Embodiment 25 provides the method of Embodiments 22-24, wherein the first solvent is methanesulfonic acid, the second solvent is dichloromethane, the hydrophobic side-chain polymer precursor is D,L-lactide, and the backbone polymer is chitosan.

Other Embodiments

The recitation of a listing of elements in any definition of a variable herein includes definitions of that variable as any single element or combination (or subcombination) of listed elements. The recitation of an embodiment herein includes that embodiment as any single embodiment or in combination with any other embodiments or portions thereof.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A hybrid molecular brush (HMB) comprising:
   a backbone polymer comprising chitosan;
   at least one hydrophilic side-chain polymer comprising at least one polymer selected from the group consisting of polyvinylpyrrolidone, polyacrylamide (PAAm), and polyethylene glycol; and
   at least one hydrophobic side-chain polymer comprising at least one polymer selected from the group consisting of polylactide (polylactic acid, PLA), polycaprolactone, polybutyrolactone, polyvalerolactone, polyglycolide (polyglycolic acid), and any random and block copolymers thereof;
   wherein the at least one hydrophilic side-chain polymer and the at least one hydrophobic side-chain polymer are covalently bound to the backbone polymer.

2. The HMB of claim 1, wherein the backbone polymer comprises chitosan, wherein the hydrophobic side-chain polymer comprises polylactide, and wherein the hydrophilic side-chain polymer comprises polyvinylpyrrolidone.

3. The HMB of claim 1, wherein the HMB comprises about 1 to about 10,000 hydrophobic side-chain polymers per backbone polymer.

4. The HMB of claim 3, wherein the HMB comprises about 9 to about 10 hydrophobic side-chain polymers per backbone polymer.

5. The HMB of claim 1, wherein the HMB comprises a chitosan backbone polymer having a number average molecular weight of about 1 kDa to about 1,000 kDa.

6. The HMB of claim 5, wherein the HMB comprises a chitosan backbone polymer having a number average molecular weight of about 11 kDa.

7. The HMB of claim 1, wherein the HMB comprises polylactide side-chain polymers having a number average molecular weight of about 1 kDa to about 100 kDa.

8. The HMB of claim 7, wherein the HMB comprises polylactide side-chain polymers having a number average molecular weight of about 3.4 kDa.

9. The HMB of claim 1, wherein the HMB has a number average molecular weight of about 3 kDa to about 2,000 kDa.

10. The HMB of claim 9, wherein the HMB has a number average molecular weight of about 12 kDa to about 120 kDa.

11. The HMB of claim 1, wherein the chitosan backbone has a polydispersity index of about 1.1 to about 5.

12. The HMB of claim 1, wherein the HMB comprises polylactide side-chains having a polydispersity index of about 1.01 to about 2.

13. The HMB of claim 1, wherein the HMB is grafted onto a surface.

14. The HMB of claim 13, wherein the HMB is grafted onto the surface via a covalent bond between the backbone polymer and a surface species.

15. The HMB of claim 14, wherein the surface species is a polymer deposited onto a surface.

16. The HMB of claim 13, wherein the surface comprises silicon.

17. A method of making a hybrid molecular brush, the method comprising grafting a hydrophobic polymer to a backbone polymer in a biphasic non-emulsion system.

18. The method of claim 17, a biphasic non-emulsion system is prepared by mixing a first solution of a backbone polymer in a first solvent with a second solution of a side-chain polymer precursor in a second solvent, wherein the first solution and the second solution are immiscible upon first contact and do not form an emulsion.

19. The method of claim 18, wherein the first solvent is polar, the second solvent is non-polar, and the side-chain polymer precursor is a hydrophobic side-chain polymer precursor.

20. The method of claim 18, wherein the first solvent is methanesulfonic acid, the second solvent is dichloromethane, the hydrophobic side-chain polymer precursor is D,L-lactide, and the backbone polymer is chitosan.

* * * * *